US008732309B1

(12) United States Patent
Richardson et al.

(10) Patent No.: US 8,732,309 B1
(45) Date of Patent: May 20, 2014

(54) REQUEST ROUTING UTILIZING COST INFORMATION

(75) Inventors: David R. Richardson, Seattle, WA (US); Bradley E. Marshall, Bainbridge Island, WA (US); Swaminathan Sivasubramanian, Seattle, WA (US); Tal Saraf, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 199 days.

(21) Appl. No.: 12/272,655

(22) Filed: Nov. 17, 2008

(51) Int. Cl.
G06F 15/173 (2006.01)

(52) U.S. Cl.
USPC .......................................... 709/226; 709/223

(58) Field of Classification Search
USPC ................................................ 709/223, 226
See application file for complete search history.

(56) References Cited

U.S. PATENT DOCUMENTS

| | | | |
|---|---|---|---|
| 5,341,477 A | 8/1994 | Pitkin et al. |
| 5,611,049 A | 3/1997 | Pitts |
| 5,774,660 A | 6/1998 | Brendel et al. |
| 5,892,914 A | 4/1999 | Pitts |
| 5,933,811 A | 8/1999 | Angles et al. |
| 5,974,454 A | 10/1999 | Apfel et al. |
| 6,016,512 A | 1/2000 | Huitema |
| 6,026,452 A | 2/2000 | Pitts |
| 6,052,718 A | 4/2000 | Gifford |
| 6,085,234 A | 7/2000 | Pitts et al. |
| 6,098,096 A | 8/2000 | Tsirigotis et al. |
| 6,108,703 A | 8/2000 | Leighton et al. |
| 6,182,111 B1 | 1/2001 | Inohara et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |

(Continued)

FOREIGN PATENT DOCUMENTS

| | | |
|---|---|---|
| CN | 1422468 A | 6/2003 |
| CN | 1605182 A | 4/2005 |

(Continued)

OTHER PUBLICATIONS

Examination Report in Singapore Application No. 201103333-9 dated Aug. 13, 2013.

(Continued)

*Primary Examiner* — Phuoc Nguyen
*Assistant Examiner* — Steven Nguyen
(74) *Attorney, Agent, or Firm* — Knobbe, Martens, Olson & Bear, LLP

(57) ABSTRACT

A system, method and computer-readable medium for request routing based on cost information are provided. A client request processing a resource identifier for requested content transmits a first DNS query to a content delivery network service provider. The content delivery network service provider transmits an alternative resource identifier in response to the client computing device DNS query. The alternative resource identifier is selected as a function of cost information. The client computing device then issues a second DNS query to the same content delivery network service provider. The content delivery network service provider can then either resolve the second DNS query with an IP address of a cache component or transmit another alternative resource identifier that will resolve to the content delivery network service provider. The process can repeat with the content delivery network service provider's network until a DNS nameserver resolves a DNS query from the client computing device.

34 Claims, 8 Drawing Sheets

(56) References Cited

U.S. PATENT DOCUMENTS

| | | | |
|---|---|---|---|
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,484,143 B1 | 11/2002 | Swildens et al. |
| 6,505,241 B2 | 1/2003 | Pitts |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,654,807 B2 | 11/2003 | Farber et al. |
| 6,658,462 B1 | 12/2003 | Dutta |
| 6,678,791 B1 | 1/2004 | Jacobs et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,769,031 B1 | 7/2004 | Bero |
| 6,782,398 B1 | 8/2004 | Bahl |
| 6,785,704 B1 | 8/2004 | McCanne |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,874,017 B1 | 3/2005 | Inoue et al. |
| 6,963,850 B1 | 11/2005 | Bezos et al. |
| 6,981,017 B1 | 12/2005 | Kasriel et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,099,936 B2 | 8/2006 | Chase et al. |
| 7,103,645 B2 | 9/2006 | Leighton et al. |
| 7,117,262 B2 | 10/2006 | Bai et al. |
| 7,133,905 B2 | 11/2006 | Dilley et al. |
| 7,139,821 B1 | 11/2006 | Shah et al. |
| 7,143,169 B1 | 11/2006 | Champagne et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,174,382 B2 | 2/2007 | Ramanathan et al. |
| 7,185,063 B1 | 2/2007 | Kasriel et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,216,170 B2 | 5/2007 | Danker et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,269,784 B1 | 9/2007 | Kasriel et al. |
| 7,274,658 B2 | 9/2007 | Bornstein et al. |
| 7,289,519 B1 | 10/2007 | Liskov |
| 7,293,093 B2 | 11/2007 | Leighton |
| 7,310,686 B2 | 12/2007 | Uysal |
| 7,316,648 B2 | 1/2008 | Kelly et al. |
| 7,320,131 B1 * | 1/2008 | O'Toole, Jr. ................. 718/104 |
| 7,321,918 B2 | 1/2008 | Burd et al. |
| 7,363,291 B1 | 4/2008 | Page |
| 7,373,416 B2 | 5/2008 | Kagan et al. |
| 7,430,610 B2 | 9/2008 | Pace et al. |
| 7,441,045 B2 | 10/2008 | Skene et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,499,998 B2 | 3/2009 | Toebes et al. |
| 7,502,836 B1 | 3/2009 | Menditto et al. |
| 7,519,720 B2 | 4/2009 | Fishman et al. |
| 7,548,947 B2 | 6/2009 | Kasriel et al. |
| 7,552,235 B2 | 6/2009 | Chase et al. |
| 7,565,407 B1 | 7/2009 | Hayball |
| 7,573,916 B1 | 8/2009 | Bechtolsheim et al. |
| 7,594,189 B1 | 9/2009 | Walker et al. |
| 7,596,619 B2 | 9/2009 | Leighton et al. |
| 7,623,460 B2 | 11/2009 | Miyazaki |
| 7,624,169 B2 | 11/2009 | Lisiecki et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,622 B1 | 2/2010 | Douglis et al. |
| 7,680,897 B1 | 3/2010 | Carter et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,809,597 B2 | 10/2010 | Das et al. |
| 7,813,308 B2 | 10/2010 | Reddy et al. |
| 7,818,454 B2 | 10/2010 | Kim et al. |
| 7,836,177 B2 | 11/2010 | Kasriel et al. |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,949,779 B2 | 5/2011 | Farber et al. |
| 7,962,597 B2 | 6/2011 | Richardson et al. |
| 7,966,404 B2 | 6/2011 | Hedin et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,028,090 B2 | 9/2011 | Richardson et al. |
| 8,041,809 B2 | 10/2011 | Sundaram et al. |

(56) References Cited

U.S. PATENT DOCUMENTS

| | | | |
|---|---|---|---|
| 8,041,818 B2 | 10/2011 | Gupta et al. | |
| 8,065,275 B2 | 11/2011 | Eriksen et al. | |
| 8,069,231 B2 | 11/2011 | Schran et al. | |
| 8,073,940 B1 | 12/2011 | Richardson et al. | |
| 8,082,348 B1 | 12/2011 | Averbuj et al. | |
| 8,117,306 B1 | 2/2012 | Baumback et al. | |
| 8,122,098 B1 | 2/2012 | Richardson et al. | |
| 8,122,124 B1 | 2/2012 | Baumback et al. | |
| 8,135,820 B2 | 3/2012 | Richardson et al. | |
| 8,156,243 B2 | 4/2012 | Richardson et al. | |
| 8,190,682 B2 | 5/2012 | Paterson-Jones et al. | |
| 8,224,986 B1 | 7/2012 | Liskov et al. | |
| 8,234,403 B2 | 7/2012 | Richardson et al. | |
| 8,266,288 B2 | 9/2012 | Banerjee et al. | |
| 8,301,645 B1 | 10/2012 | Crook | |
| 8,321,568 B2 | 11/2012 | Sivasubramanian et al. | |
| 8,402,137 B2 | 3/2013 | Sivasubramanian et al. | |
| 8,452,874 B2 | 5/2013 | MacCarthaigh et al. | |
| 2001/0000811 A1 | 5/2001 | May et al. | |
| 2001/0032133 A1 | 10/2001 | Moran | |
| 2001/0034704 A1 | 10/2001 | Farhat et al. | |
| 2001/0049741 A1 | 12/2001 | Skene et al. | |
| 2001/0052016 A1 | 12/2001 | Skene et al. | |
| 2001/0056416 A1 | 12/2001 | Garcia-Luna-Aceves | |
| 2001/0056500 A1* | 12/2001 | Farber et al. | 709/245 |
| 2002/0002613 A1 | 1/2002 | Freeman et al. | |
| 2002/0007413 A1 | 1/2002 | Garcia-Luna-Aceves et al. | |
| 2002/0048269 A1 | 4/2002 | Hong et al. | |
| 2002/0049608 A1* | 4/2002 | Hartsell et al. | 705/1 |
| 2002/0052942 A1 | 5/2002 | Swildens et al. | |
| 2002/0062372 A1 | 5/2002 | Hong et al. | |
| 2002/0068554 A1 | 6/2002 | Dusse | |
| 2002/0069420 A1 | 6/2002 | Russell et al. | |
| 2002/0078233 A1 | 6/2002 | Biliris et al. | |
| 2002/0082858 A1 | 6/2002 | Heddaya et al. | |
| 2002/0083118 A1 | 6/2002 | Sim | |
| 2002/0083148 A1 | 6/2002 | Shaw et al. | |
| 2002/0087374 A1 | 7/2002 | Boubez et al. | |
| 2002/0092026 A1 | 7/2002 | Janniello et al. | |
| 2002/0099616 A1 | 7/2002 | Sweldens | |
| 2002/0099850 A1 | 7/2002 | Farber et al. | |
| 2002/0101836 A1 | 8/2002 | Dorenbosch | |
| 2002/0107944 A1 | 8/2002 | Bai et al. | |
| 2002/0112049 A1 | 8/2002 | Elnozahy et al. | |
| 2002/0116481 A1 | 8/2002 | Lee | |
| 2002/0116491 A1 | 8/2002 | Boyd et al. | |
| 2002/0124047 A1 | 9/2002 | Gartner et al. | |
| 2002/0124098 A1 | 9/2002 | Shaw | |
| 2002/0129123 A1 | 9/2002 | Johnson et al. | |
| 2002/0135611 A1 | 9/2002 | Deosaran et al. | |
| 2002/0138286 A1 | 9/2002 | Engstrom | |
| 2002/0138437 A1 | 9/2002 | Lewin et al. | |
| 2002/0143989 A1 | 10/2002 | Huitema et al. | |
| 2002/0147770 A1 | 10/2002 | Tang | |
| 2002/0147774 A1 | 10/2002 | Lisiecki et al. | |
| 2002/0150094 A1 | 10/2002 | Cheng et al. | |
| 2002/0156911 A1 | 10/2002 | Croman et al. | |
| 2002/0161767 A1 | 10/2002 | Shapiro et al. | |
| 2002/0163882 A1 | 11/2002 | Bornstein et al. | |
| 2002/0165912 A1 | 11/2002 | Wenocur et al. | |
| 2002/0188722 A1 | 12/2002 | Banerjee et al. | |
| 2002/0198953 A1 | 12/2002 | O'Rourke et al. | |
| 2003/0002484 A1 | 1/2003 | Freedman | |
| 2003/0009591 A1 | 1/2003 | Hayball et al. | |
| 2003/0028642 A1 | 2/2003 | Agarwal et al. | |
| 2003/0033283 A1 | 2/2003 | Evans et al. | |
| 2003/0037139 A1 | 2/2003 | Shteyn | |
| 2003/0065739 A1 | 4/2003 | Shnier | |
| 2003/0074401 A1 | 4/2003 | Connell et al. | |
| 2003/0079027 A1 | 4/2003 | Slocombe et al. | |
| 2003/0093523 A1 | 5/2003 | Cranor et al. | |
| 2003/0099202 A1 | 5/2003 | Lear et al. | |
| 2003/0101278 A1 | 5/2003 | Garcia-Luna-Aceves et al. | |
| 2003/0120741 A1 | 6/2003 | Wu et al. | |
| 2003/0133554 A1 | 7/2003 | Nykanen et al. | |
| 2003/0135509 A1 | 7/2003 | Davis et al. | |
| 2003/0140087 A1 | 7/2003 | Lincoln et al. | |
| 2003/0145038 A1 | 7/2003 | Tariq et al. | |
| 2003/0145066 A1 | 7/2003 | Okada et al. | |
| 2003/0149581 A1* | 8/2003 | Chaudhri et al. | 705/1 |
| 2003/0154284 A1 | 8/2003 | Bernardin et al. | |
| 2003/0163722 A1 | 8/2003 | Anderson, IV | |
| 2003/0172145 A1 | 9/2003 | Nguyen | |
| 2003/0172183 A1 | 9/2003 | Anderson, IV et al. | |
| 2003/0172291 A1 | 9/2003 | Judge et al. | |
| 2003/0174648 A1 | 9/2003 | Wang et al. | |
| 2003/0182305 A1 | 9/2003 | Balva et al. | |
| 2003/0182413 A1 | 9/2003 | Allen et al. | |
| 2003/0182447 A1 | 9/2003 | Schilling | |
| 2003/0187935 A1 | 10/2003 | Agarwalla et al. | |
| 2003/0187970 A1 | 10/2003 | Chase et al. | |
| 2003/0191822 A1 | 10/2003 | Leighton et al. | |
| 2003/0200394 A1 | 10/2003 | Ashmore et al. | |
| 2003/0204602 A1 | 10/2003 | Hudson et al. | |
| 2003/0229682 A1 | 12/2003 | Day | |
| 2003/0233423 A1 | 12/2003 | Dilley et al. | |
| 2003/0236700 A1 | 12/2003 | Arning et al. | |
| 2004/0010621 A1 | 1/2004 | Afergan et al. | |
| 2004/0019518 A1 | 1/2004 | Abraham et al. | |
| 2004/0024841 A1 | 2/2004 | Becker et al. | |
| 2004/0030620 A1 | 2/2004 | Benjamin et al. | |
| 2004/0034744 A1 | 2/2004 | Karlsson et al. | |
| 2004/0039798 A1 | 2/2004 | Hotz et al. | |
| 2004/0044731 A1 | 3/2004 | Chen et al. | |
| 2004/0044791 A1 | 3/2004 | Pouzzner | |
| 2004/0059805 A1 | 3/2004 | Dinker et al. | |
| 2004/0064501 A1 | 4/2004 | Jan et al. | |
| 2004/0073596 A1 | 4/2004 | Kloninger et al. | |
| 2004/0073867 A1 | 4/2004 | Kausik et al. | |
| 2004/0078468 A1 | 4/2004 | Hedin et al. | |
| 2004/0078487 A1 | 4/2004 | Cernohous et al. | |
| 2004/0083307 A1* | 4/2004 | Uysal | 709/246 |
| 2004/0117455 A1 | 6/2004 | Kaminsky et al. | |
| 2004/0128344 A1 | 7/2004 | Trossen | |
| 2004/0128346 A1 | 7/2004 | Melamed et al. | |
| 2004/0167981 A1 | 8/2004 | Douglas et al. | |
| 2004/0172466 A1 | 9/2004 | Douglas et al. | |
| 2004/0194085 A1 | 9/2004 | Beaubien et al. | |
| 2004/0194102 A1 | 9/2004 | Neerdaels | |
| 2004/0203630 A1 | 10/2004 | Wang | |
| 2004/0205149 A1 | 10/2004 | Dillon et al. | |
| 2004/0205162 A1 | 10/2004 | Parikh | |
| 2004/0215823 A1 | 10/2004 | Kleinfelter et al. | |
| 2004/0221034 A1 | 11/2004 | Kausik et al. | |
| 2004/0249971 A1* | 12/2004 | Klinker | 709/239 |
| 2004/0249975 A1 | 12/2004 | Tuck et al. | |
| 2004/0254921 A1 | 12/2004 | Cohen et al. | |
| 2004/0267906 A1 | 12/2004 | Truty | |
| 2004/0267907 A1 | 12/2004 | Gustafsson | |
| 2005/0010653 A1 | 1/2005 | McCanne | |
| 2005/0021706 A1 | 1/2005 | Maggi et al. | |
| 2005/0021862 A1 | 1/2005 | Schroeder et al. | |
| 2005/0038967 A1 | 2/2005 | Umbehocker et al. | |
| 2005/0044270 A1* | 2/2005 | Grove et al. | 709/238 |
| 2005/0102683 A1 | 5/2005 | Branson et al. | |
| 2005/0108169 A1 | 5/2005 | Balasubramanian et al. | |
| 2005/0108529 A1 | 5/2005 | Juneau | |
| 2005/0114296 A1 | 5/2005 | Farber et al. | |
| 2005/0132083 A1 | 6/2005 | Raciborski et al. | |
| 2005/0157712 A1 | 7/2005 | Rangarajan et al. | |
| 2005/0163168 A1 | 7/2005 | Sheth et al. | |
| 2005/0168782 A1 | 8/2005 | Kobashi et al. | |
| 2005/0171959 A1 | 8/2005 | Deforche et al. | |
| 2005/0188073 A1 | 8/2005 | Nakamichi et al. | |
| 2005/0192008 A1 | 9/2005 | Desai et al. | |
| 2005/0198571 A1 | 9/2005 | Kramer et al. | |
| 2005/0216569 A1 | 9/2005 | Coppola et al. | |
| 2005/0216674 A1 | 9/2005 | Robbin et al. | |
| 2005/0229119 A1 | 10/2005 | Torvinen | |
| 2005/0232165 A1 | 10/2005 | Brawn et al. | |
| 2005/0259672 A1 | 11/2005 | Eduri | |
| 2005/0262248 A1 | 11/2005 | Jennings, III et al. | |
| 2005/0267991 A1 | 12/2005 | Huitema et al. | |
| 2005/0267992 A1 | 12/2005 | Huitema et al. | |

(56) References Cited

U.S. PATENT DOCUMENTS

| | | | |
|---|---|---|---|
| 2005/0267993 | A1 | 12/2005 | Huitema et al. |
| 2005/0278259 | A1 | 12/2005 | Gunaseelan et al. |
| 2005/0283759 | A1 | 12/2005 | Peteanu et al. |
| 2005/0283784 | A1 | 12/2005 | Suzuki |
| 2006/0013158 | A1 | 1/2006 | Ahuja et al. |
| 2006/0020596 | A1 | 1/2006 | Liu et al. |
| 2006/0020684 | A1 | 1/2006 | Mukherjee et al. |
| 2006/0020714 | A1 | 1/2006 | Girouard et al. |
| 2006/0020715 | A1 | 1/2006 | Jungck |
| 2006/0026067 | A1 | 2/2006 | Nicholas et al. |
| 2006/0026154 | A1 | 2/2006 | Altinel et al. |
| 2006/0036720 | A1 | 2/2006 | Faulk, Jr. |
| 2006/0037037 | A1 | 2/2006 | Miranz |
| 2006/0041614 | A1 | 2/2006 | Oe |
| 2006/0047787 | A1 | 3/2006 | Agarwal et al. |
| 2006/0047813 | A1 | 3/2006 | Aggarwal et al. |
| 2006/0059246 | A1 | 3/2006 | Grove |
| 2006/0063534 | A1 | 3/2006 | Kokkonen et al. |
| 2006/0064476 | A1 | 3/2006 | Decasper et al. |
| 2006/0064500 | A1 | 3/2006 | Roth et al. |
| 2006/0074750 | A1 | 4/2006 | Clark et al. |
| 2006/0075084 | A1 | 4/2006 | Lyon |
| 2006/0075139 | A1 | 4/2006 | Jungck |
| 2006/0083165 | A1 | 4/2006 | McLane et al. |
| 2006/0085536 | A1 | 4/2006 | Meyer et al. |
| 2006/0112066 | A1 | 5/2006 | Hamzy |
| 2006/0112176 | A1* | 5/2006 | Liu et al. ............... 709/223 |
| 2006/0120385 | A1 | 6/2006 | Atchison et al. |
| 2006/0129665 | A1 | 6/2006 | Toebes et al. |
| 2006/0143293 | A1 | 6/2006 | Freedman |
| 2006/0155823 | A1 | 7/2006 | Tran et al. |
| 2006/0161541 | A1 | 7/2006 | Cencini |
| 2006/0168088 | A1 | 7/2006 | Leighton et al. |
| 2006/0179080 | A1 | 8/2006 | Meek et al. |
| 2006/0184936 | A1 | 8/2006 | Abels et al. |
| 2006/0190605 | A1 | 8/2006 | Franz et al. |
| 2006/0195866 | A1 | 8/2006 | Thukral |
| 2006/0218304 | A1 | 9/2006 | Mukherjee et al. |
| 2006/0227740 | A1 | 10/2006 | McLaughlin et al. |
| 2006/0227758 | A1 | 10/2006 | Rana et al. |
| 2006/0230137 | A1 | 10/2006 | Gare et al. |
| 2006/0233155 | A1 | 10/2006 | Srivastava |
| 2006/0253546 | A1 | 11/2006 | Chang et al. |
| 2006/0253609 | A1 | 11/2006 | Andreev et al. |
| 2006/0259581 | A1 | 11/2006 | Piersol |
| 2006/0259690 | A1 | 11/2006 | Vittal et al. |
| 2006/0259984 | A1 | 11/2006 | Juneau |
| 2006/0265497 | A1 | 11/2006 | Ohata et al. |
| 2006/0265508 | A1 | 11/2006 | Angel et al. |
| 2006/0265516 | A1 | 11/2006 | Schilling |
| 2006/0265720 | A1 | 11/2006 | Cai et al. |
| 2006/0271641 | A1 | 11/2006 | Stavrakos et al. |
| 2006/0282522 | A1 | 12/2006 | Lewin et al. |
| 2007/0005689 | A1 | 1/2007 | Leighton et al. |
| 2007/0005892 | A1 | 1/2007 | Mullender et al. |
| 2007/0011267 | A1 | 1/2007 | Overton et al. |
| 2007/0014241 | A1 | 1/2007 | Banerjee et al. |
| 2007/0021998 | A1 | 1/2007 | Laithwaite et al. |
| 2007/0038994 | A1 | 2/2007 | Davis et al. |
| 2007/0041393 | A1 | 2/2007 | Westhead et al. |
| 2007/0043859 | A1 | 2/2007 | Ruul |
| 2007/0050522 | A1 | 3/2007 | Grove et al. |
| 2007/0050703 | A1 | 3/2007 | Lebel |
| 2007/0055764 | A1 | 3/2007 | Dilley et al. |
| 2007/0076872 | A1 | 4/2007 | Juneau |
| 2007/0086429 | A1 | 4/2007 | Lawrence et al. |
| 2007/0094361 | A1* | 4/2007 | Hoynowski et al. ......... 709/220 |
| 2007/0101377 | A1 | 5/2007 | Six et al. |
| 2007/0118667 | A1 | 5/2007 | McCarthy et al. |
| 2007/0118668 | A1 | 5/2007 | McCarthy et al. |
| 2007/0134641 | A1 | 6/2007 | Lieu |
| 2007/0168517 | A1 | 7/2007 | Weller |
| 2007/0174426 | A1 | 7/2007 | Swildens et al. |
| 2007/0174442 | A1 | 7/2007 | Sherman et al. |
| 2007/0174490 | A1 | 7/2007 | Choi et al. |
| 2007/0183342 | A1 | 8/2007 | Wong et al. |
| 2007/0198982 | A1 | 8/2007 | Bolan et al. |
| 2007/0208737 | A1 | 9/2007 | Li et al. |
| 2007/0219795 | A1 | 9/2007 | Park et al. |
| 2007/0220010 | A1 | 9/2007 | Ertugrul |
| 2007/0244964 | A1 | 10/2007 | Challenger et al. |
| 2007/0250467 | A1 | 10/2007 | Mesnik et al. |
| 2007/0250560 | A1 | 10/2007 | Wein et al. |
| 2007/0250611 | A1 | 10/2007 | Bhogal et al. |
| 2007/0253377 | A1 | 11/2007 | Janneteau et al. |
| 2007/0255843 | A1 | 11/2007 | Zubev |
| 2007/0266113 | A1 | 11/2007 | Koopmans et al. |
| 2007/0266311 | A1 | 11/2007 | Westphal |
| 2007/0266333 | A1 | 11/2007 | Cossey et al. |
| 2007/0271375 | A1 | 11/2007 | Hwang |
| 2007/0271385 | A1 | 11/2007 | Davis et al. |
| 2007/0280229 | A1 | 12/2007 | Kenney |
| 2007/0288588 | A1 | 12/2007 | Wein et al. |
| 2008/0005057 | A1 | 1/2008 | Ozzie et al. |
| 2008/0005089 | A1 | 1/2008 | Bates et al. |
| 2008/0025304 | A1 | 1/2008 | Venkataswami et al. |
| 2008/0046596 | A1 | 2/2008 | Afergan et al. |
| 2008/0065724 | A1 | 3/2008 | Seed et al. |
| 2008/0065745 | A1 | 3/2008 | Leighton et al. |
| 2008/0071859 | A1 | 3/2008 | Seed et al. |
| 2008/0071987 | A1 | 3/2008 | Karn et al. |
| 2008/0072264 | A1 | 3/2008 | Crayford |
| 2008/0082551 | A1 | 4/2008 | Farber et al. |
| 2008/0086574 | A1 | 4/2008 | Raciborski et al. |
| 2008/0103805 | A1 | 5/2008 | Shear et al. |
| 2008/0104268 | A1 | 5/2008 | Farber et al. |
| 2008/0114829 | A1 | 5/2008 | Button et al. |
| 2008/0134043 | A1 | 6/2008 | Georgis et al. |
| 2008/0147866 | A1 | 6/2008 | Stolorz et al. |
| 2008/0147873 | A1 | 6/2008 | Matsumoto |
| 2008/0155061 | A1 | 6/2008 | Afergan et al. |
| 2008/0155614 | A1 | 6/2008 | Cooper et al. |
| 2008/0162667 | A1 | 7/2008 | Verma et al. |
| 2008/0172488 | A1 | 7/2008 | Jawahar et al. |
| 2008/0189437 | A1* | 8/2008 | Halley ............... 709/245 |
| 2008/0193247 | A1 | 8/2008 | Naseh et al. |
| 2008/0201332 | A1 | 8/2008 | Souders et al. |
| 2008/0215718 | A1 | 9/2008 | Stolorz et al. |
| 2008/0215735 | A1 | 9/2008 | Farber et al. |
| 2008/0215750 | A1 | 9/2008 | Farber et al. |
| 2008/0222281 | A1 | 9/2008 | Dilley et al. |
| 2008/0222291 | A1 | 9/2008 | Weller et al. |
| 2008/0222295 | A1 | 9/2008 | Robinson et al. |
| 2008/0228574 | A1 | 9/2008 | Stewart et al. |
| 2008/0228920 | A1 | 9/2008 | Souders et al. |
| 2008/0235400 | A1 | 9/2008 | Slocombe et al. |
| 2008/0275772 | A1 | 11/2008 | Suryanarayana et al. |
| 2008/0281950 | A1 | 11/2008 | Wald et al. |
| 2008/0288722 | A1 | 11/2008 | Lecoq et al. |
| 2008/0301670 | A1 | 12/2008 | Gouge et al. |
| 2008/0319862 | A1 | 12/2008 | Golan et al. |
| 2009/0013063 | A1 | 1/2009 | Soman |
| 2009/0016236 | A1 | 1/2009 | Alcala et al. |
| 2009/0029644 | A1 | 1/2009 | Sue et al. |
| 2009/0031367 | A1 | 1/2009 | Sue |
| 2009/0031368 | A1 | 1/2009 | Ling |
| 2009/0031376 | A1 | 1/2009 | Riley et al. |
| 2009/0049098 | A1 | 2/2009 | Pickelsimer et al. |
| 2009/0070533 | A1 | 3/2009 | Elazary et al. |
| 2009/0083228 | A1 | 3/2009 | Shatz et al. |
| 2009/0086741 | A1 | 4/2009 | Zhang |
| 2009/0103707 | A1 | 4/2009 | McGary et al. |
| 2009/0106381 | A1 | 4/2009 | Kasriel et al. |
| 2009/0112703 | A1 | 4/2009 | Brown |
| 2009/0125934 | A1 | 5/2009 | Jones et al. |
| 2009/0132368 | A1 | 5/2009 | Cotter et al. |
| 2009/0132648 | A1 | 5/2009 | Swildens et al. |
| 2009/0144412 | A1 | 6/2009 | Ferguson et al. |
| 2009/0150926 | A1 | 6/2009 | Schlack |
| 2009/0157850 | A1 | 6/2009 | Gagliardi et al. |
| 2009/0158163 | A1 | 6/2009 | Stephens et al. |
| 2009/0164331 | A1 | 6/2009 | Bishop et al. |
| 2009/0177667 | A1 | 7/2009 | Ramos et al. |
| 2009/0182815 | A1 | 7/2009 | Czechowski et al. |

(56) References Cited

U.S. PATENT DOCUMENTS

| | | | |
|---|---|---|---|
| 2009/0182945 | A1 | 7/2009 | Aviles et al. |
| 2009/0187575 | A1 | 7/2009 | DaCosta |
| 2009/0204682 | A1 | 8/2009 | Jeyaseelan et al. |
| 2009/0210549 | A1 | 8/2009 | Hudson et al. |
| 2009/0248786 | A1 | 10/2009 | Richardson et al. |
| 2009/0248787 | A1 | 10/2009 | Sivasubramanian et al. |
| 2009/0248852 | A1 | 10/2009 | Fuhrmann et al. |
| 2009/0248858 | A1 | 10/2009 | Sivasubramanian et al. |
| 2009/0248893 | A1 | 10/2009 | Richardson et al. |
| 2009/0259971 | A1 | 10/2009 | Rankine et al. |
| 2009/0271577 | A1 | 10/2009 | Campana et al. |
| 2009/0271730 | A1 | 10/2009 | Rose et al. |
| 2009/0279444 | A1 | 11/2009 | Ravindran et al. |
| 2009/0287750 | A1 | 11/2009 | Banavar et al. |
| 2009/0307307 | A1 | 12/2009 | Igarashi |
| 2009/0327489 | A1 | 12/2009 | Swildens et al. |
| 2009/0327517 | A1 | 12/2009 | Sivasubramanian et al. |
| 2009/0327914 | A1 | 12/2009 | Adar et al. |
| 2010/0005175 | A1 | 1/2010 | Swildens et al. |
| 2010/0011061 | A1 | 1/2010 | Hudson et al. |
| 2010/0023601 | A1 | 1/2010 | Lewin et al. |
| 2010/0030662 | A1 | 2/2010 | Klein |
| 2010/0034470 | A1 | 2/2010 | Valencia-Campo et al. |
| 2010/0036944 | A1 | 2/2010 | Douglis et al. |
| 2010/0070603 | A1 | 3/2010 | Moss et al. |
| 2010/0088367 | A1 | 4/2010 | Brown et al. |
| 2010/0088405 | A1 | 4/2010 | Huang et al. |
| 2010/0100629 | A1 | 4/2010 | Raciborski et al. |
| 2010/0111059 | A1 | 5/2010 | Bappu et al. |
| 2010/0121953 | A1 | 5/2010 | Friedman et al. |
| 2010/0122069 | A1 | 5/2010 | Gonion |
| 2010/0125673 | A1 | 5/2010 | Richardson et al. |
| 2010/0131646 | A1 | 5/2010 | Drako |
| 2010/0150155 | A1 | 6/2010 | Napierala |
| 2010/0192225 | A1 | 7/2010 | Ma et al. |
| 2010/0217801 | A1 | 8/2010 | Leighton et al. |
| 2010/0226372 | A1 | 9/2010 | Watanabe |
| 2010/0257566 | A1 | 10/2010 | Matila |
| 2010/0293479 | A1 | 11/2010 | Rousso et al. |
| 2010/0299439 | A1 | 11/2010 | McCarthy et al. |
| 2010/0318508 | A1 | 12/2010 | Brawer et al. |
| 2010/0332595 | A1 | 12/2010 | Fullagar et al. |
| 2011/0040893 | A1 | 2/2011 | Karaoguz et al. |
| 2011/0078000 | A1 | 3/2011 | Ma et al. |
| 2011/0078230 | A1 | 3/2011 | Sepulveda |
| 2011/0096987 | A1 | 4/2011 | Morales et al. |
| 2011/0153941 | A1 | 6/2011 | Spatscheck et al. |
| 2011/0238501 | A1 | 9/2011 | Almeida |
| 2011/0238793 | A1 | 9/2011 | Bedare et al. |
| 2011/0252142 | A1 | 10/2011 | Richardson et al. |
| 2011/0252143 | A1 | 10/2011 | Baumback et al. |
| 2011/0258049 | A1 | 10/2011 | Ramer et al. |
| 2011/0276623 | A1 | 11/2011 | Girbal |
| 2012/0066360 | A1 | 3/2012 | Ghosh |
| 2012/0131177 | A1 | 5/2012 | Brandt et al. |
| 2012/0179839 | A1 | 7/2012 | Raciborski et al. |

FOREIGN PATENT DOCUMENTS

| | | |
|---|---|---|
| CN | 101189598 A | 5/2008 |
| CN | 101460907 A | 6/2009 |
| EP | 2008167 | 12/2008 |
| JP | 2003-167810 A | 6/2003 |
| JP | 2003522358 A | 7/2003 |
| JP | 2007-133896 A | 5/2007 |
| WO | WO 2007/007960 A1 | 1/2007 |
| WO | WO 2007/126837 A3 | 11/2007 |
| WO | WO 2012/044587 A1 | 4/2012 |

OTHER PUBLICATIONS

Office Action in Canadian Application No. 2741895 dated Oct. 21, 2013.
Office Action in Chinese Application No. 200980119993.1 dated Oct. 21, 2013.
Baglioni et al., "Preprocessing and Mining Web Log Data for Web Personalization", LNAI 2829, 2003, pp. 237-249.
International Search Report and Written Opinion in PCT/US2011/053302 mailed Nov. 28, 2011 in 11 pages.
International Search Report and Written Opinion in PCT/US2011/061486 mailed Mar. 30, 2012 in 11 pages.
Liu et al., "Combined mining of Web server logs and web contents for classifying user navigation patterns and predicting users' future requests," Data & Knowledge Engineering 61 (2007) pp. 304-330.
Singapore Written Opinion in Application No. 201006836-9, mailed Oct. 12, 2011 in 12 pages.
Singapore Written Opinion in Application No. 201006837-7, mailed Oct. 12, 2011 in 11 pages.
Singapore Written Opinion in Application No. 201006874-0, mailed Oct. 12, 2011 in 10 pages.
Supplementary European Search Report in Application No. 09727694.3 mailed Jan. 30, 2012 in 6 pages.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.
Office Action in Canadian Application No. 2741895 dated Feb. 25, 2013.
Office Action in Korean Application No. 10-2011-7002461 mailed May 29, 2013.
Preliminary Examination in Chinese Application No. 201180053405.6 dated May 28, 2013. English Translation Not Yet Received.
American Bar Association; Digital Signature Guidelines Tutorial [online]; Feb. 10, 2002 [retrived on Mar. 2, 2010]; American Bar Association Section of Science and Technology Information Security Committee; Retrieved from the internet: <URL: http://web.archive.org/web/20020210124615/www.abanet.org/scitech/ec/isc/dgs-tutorial.html; pp. 1-8.
First Office Action in Chinese Application No. 200980119993.1 dated Jul. 4, 2012.
First Office Action in Chinese Application No. 200980119995.0 dated Jul. 6, 2012.
Singapore Examination Report in Application No. 201006837-7 mailed May 16, 2012.
First Office Action in Chinese Application No. 200980145872.4 dated Nov. 29, 2012.
Search Report and Written Opinion in Singapore Application No. 201103333-9 mailed Nov. 19, 2012.
Singapore Written Opinion in Application No. 201006836-9, mailed Apr. 30, 2012 in 10 pages.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bennami, M., et al., Resource Allocation for Autonomic Data Centers Using Analytic Performance Models, 2005, IEEE, 12 pages.
Chipara et al, "Realtime Power-Aware Routing in Sensor Network", IEEE, 2006, 10 pages.
International Preliminary Report on Patentability and Written Opinion in PCT/US2010/060567 mailed on Jun. 19, 2012.
International Preliminary Report on Patentability and Written Opinion in PCT/US2010/060569 mailed Jun. 19, 2012.
International Preliminary Report on Patentability and Written Opinion in PCT/US2010/060573 mailed Jun. 19, 2012.
International Preliminary Report on Patentability in PCT/US2011/053302 mailed Apr. 2, 2013.
International Preliminary Report on Patentability in PCT/US2011/061486 mailed May 22, 2013.
Kounev, S., et al., Autonomic QoS-Aware Resource Management in Grid Computing Using Online Performance Models, 2007, ICST, Valuetools, 2007, 10 pages.
Office Action in Canadian Application No. 2726915 dated May 13, 2013.
Office Action in Chinese Application No. 200780020255.2 dated Mar. 4, 2013.

(56) References Cited

OTHER PUBLICATIONS

Office Action in Chinese Application No. 200980119995.0 dated Apr. 15, 2013.
Office Action in Japanese Application No. 2011-516466 mailed Mar. 6, 2013.
Second Office Action in Chinese Application No. 200980119993.1 dated Mar. 12, 2013.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
First Office Action in Chinese Application No. 200980111426.1 mailed Feb. 16, 2013.
Gruener, J., "A Vision of Togetherness," May 24, 2004, NetworkWorld, retrieved May 3, 2006, from, http://www.networkworld.com/supp/2004/ndc3/0524virt.html, 9 pages.
International Preliminary Report on Patentability in PCT/US2007/007601 mailed Sep. 30, 2008 in 8 pages.
International Search Report and Written Opinion in PCT/US07/07601 mailed Jul. 18, 2008 in 11 pages.
International Search Report and Written Opinion in PCT/US2010/060567 mailed on Mar. 28, 2012.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kenshi, P., "Help File Library: Iptables Basics," Justlinux, retrieved Dec. 1, 2005, from http://www.justlinux.com/nhf/Security/Iptables _ Basics.html, 4 pages.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Office Action in Candian Application No. 2741895 dated Feb. 25, 2013.
Office Action in Japanese Application No. 2011-502138 mailed Feb. 1, 2013.
Office Action in Japanese Application No. 2011-502140 mailed Dec. 7, 2012.
Office Action in Japanese Application No. 2012-052264 mailed Dec. 11, 2012 in 26 pages.
Shankland, S., "Sun to buy start-up to bolster N1," Jul. 30, 2003, CNet News.com, retrieved May 3, 2006, http://news.zdnet.com/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Supplementary European Search Report in Application No. 07754164.7 mailed Dec. 20, 2010 in 7 pages.
Supplementary European Search Report in Application No. 09728756.9 mailed Jan. 8, 2013.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA, "Spawn: A Distributed Computational Economy," Feb. 1992, IEEE Transactions on Software Engineering, 18(2): 103-117, I5 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.

* cited by examiner

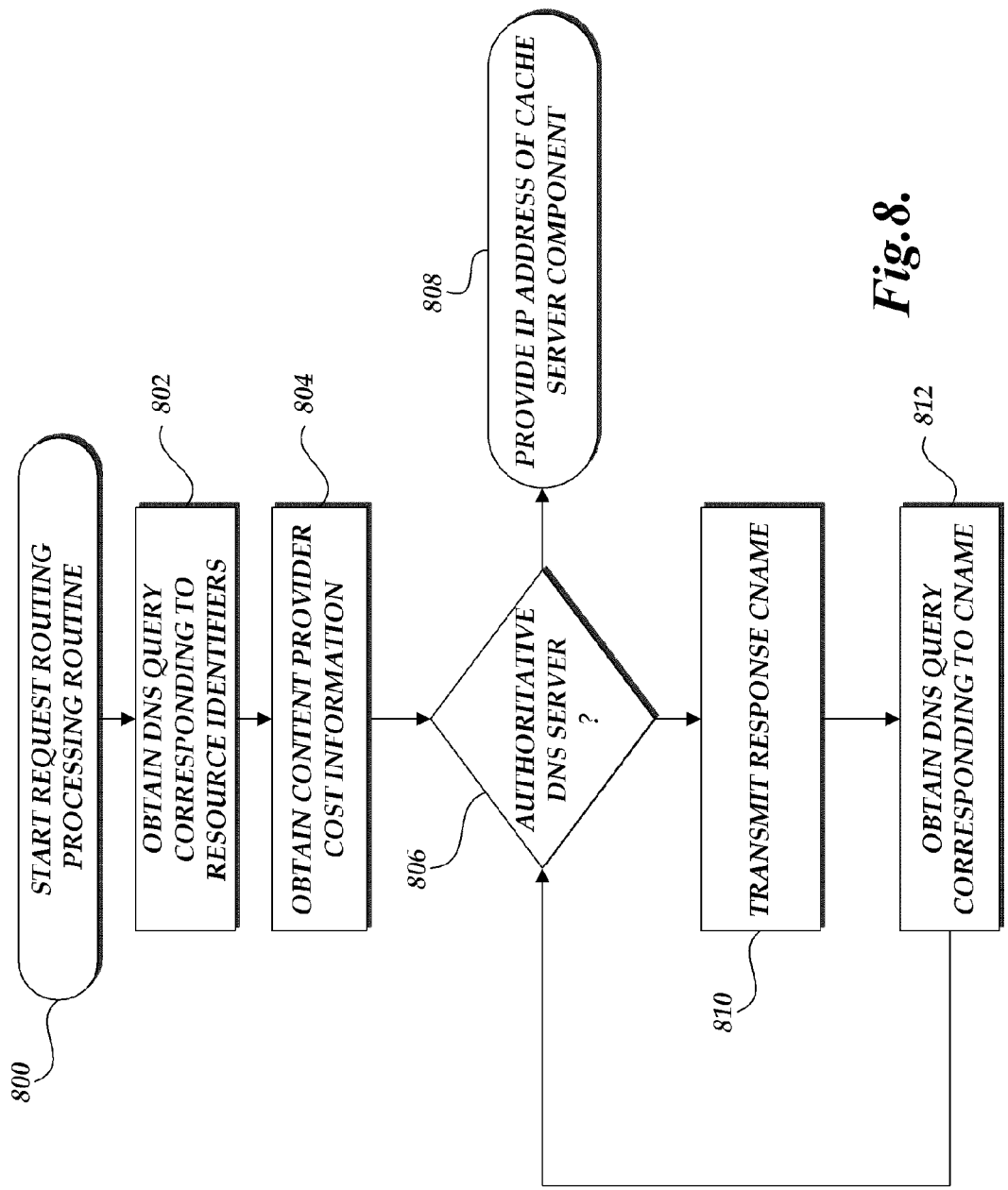

REQUEST ROUTING UTILIZING COST INFORMATION

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device and/or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

Some content providers attempt to facilitate the delivery of requested content, such as Web pages and/or resources identified in Web pages, through the utilization of a content delivery network ("CDN") service provider. A CDN server provider typically maintains a number of computing devices in a communication network that can maintain content from various content providers. In turn, content providers can instruct, or otherwise suggest to, client computing devices to request some, or all, of the content provider's content from the CDN service provider's computing devices. Upon receipt of resource requests from such client computing devices, a CDN service provider typically delivers the requested resource in accordance with terms (such as via a service plan) specified between a corresponding content provider and the CDN service provider.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 8 is a flow diagram illustrative of a request routing routine implemented by a content delivery network service provider utilizing cost information associated with the processing of a resource request.

DETAILED DESCRIPTION

Generally described, the present disclosure is directed to the routing of a DNS query from a client computing device corresponding to content requests by a network resource, such as content delivery network ("CDN") service providers. The processing of a DNS query by a CDN service provider is generally referred to as request routing. Specifically, aspects of the disclosure will be described with regard to the routing of a client computing device DNS query within a content delivery network service provider domain as a function of cost information associated with the processing of the content request from the client computing device. In one embodiment, a CDN service provider utilizes cost information to select components of a CDN network to provide the requested resource. The CDN network component can be selected while attempting to keep a cost associated with the request routing below a cost threshold or while attempting to select the lowest cost. Although various aspects of the disclosure will be described with regard to illustrative examples and embodiments, one skilled in the art will appreciate that the disclosed embodiments and examples should not be construed as limiting.

Figure 1:
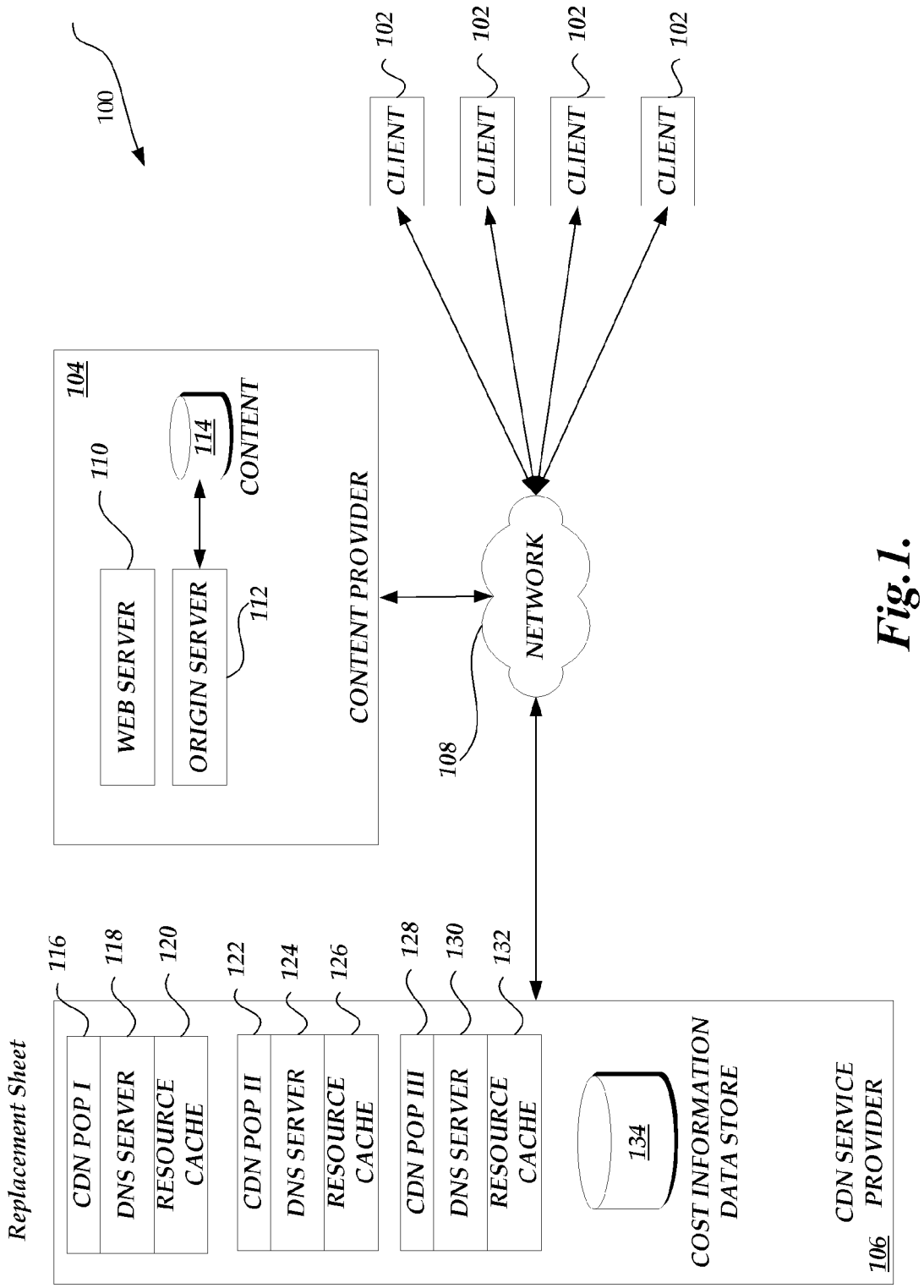
FIG. 1 is a block diagram illustrative of content delivery environment including a number of client computing devices, content provider, and a content delivery network service provider.

FIG. 1 is a block diagram illustrative of content delivery environment 100 for the management and processing of content requests. As illustrated in FIG. 1, the content delivery environment 100 includes a number of client computing devices 102 (generally referred to as clients) for requesting content from a content provider and/or a CDN service provider. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS nameserver, that generates the DNS queries attributed to the client computing device. In one embodiment, the local DNS resolver component may be provided by an enterprise network to which the client computing device 102 belongs. In another embodiment, the local DNS resolver component may be provided by an Internet Service Provider (ISP) that provides the communication network connection to the client computing device 102.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102. The content provider 104 can further include an origin server component 112 and associated storage component 114 corresponding to one or more computing devices for obtaining and processing requests for network resources from the CDN service provider. One skilled in the relevant art will appreciate that the content provider 104 can be associated with various additional computing resources, such additional computing devices for administration of content and resources, DNS nameservers, and the like. For example, although not illustrated in FIG. 1, the content provider 104 can be associated with one or more DNS nameserver components that receive DNS queries associated with the domain of the content provider 104 and that would be authoritative to resolve client computing device DNS queries corresponding to a domain of the content provider (e.g., return an IP address responsive to the DNS query). A DNS nameserver component is considered to be authoritative to a DNS query if the DNS nameserver can completely resolve the query by providing a responsive IP address.

With continued reference to FIG. 1, the content delivery environment 100 can further include a CDN service provider 106 in communication with the one or more client computing devices 102 and the content providers 104 via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each POP 116, 122, 128 includes a DNS component 118, 124, 130 made up of a number of DNS nameserver computing devices for resolving DNS queries from the client computers 102. Each POP 116, 122, 128 also includes a resource cache component 120, 126, 132 made up of a number of cache server computing devices for storing resources from content providers and transmitting various requested resources to various client computers.

Still further, the CDN service provider 106 includes a cost information data store 134 for maintaining information regarding cost profiles or configurations specified by various content providers 104. The cost information data store 134 can also maintain cost information associated with an estimated cost associated with providing a requested resource for each of the POPs 116, 122, 128. In an illustrative embodiment, the cost information data store 134 corresponds to a central data store accessible by the POPs 116, 122, 128, such as via a Web service. In another embodiment, each POP 116, 122, 128 can maintain a local version of a cost information data store 134 for utilization in request routing as will be explained in greater detail. Additionally, although the cost information data store 134 is illustrated as a single data store, one skilled in the relevant art will appreciate that cost information data store 134 may correspond to one or more data stores and may be implemented in a distributed manner.

The DNS components 118, 124, 130 and the resource cache components 120, 126, 132 may further include additional software and/or hardware components that facilitate communications including, but not limited, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the POPs 116, 122, 128 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the CDN service provider 106 can be associated with various additional computing resources, such additional computing devices for administration of content and resources, and the like.

With reference now to FIGS. 2-7, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2:
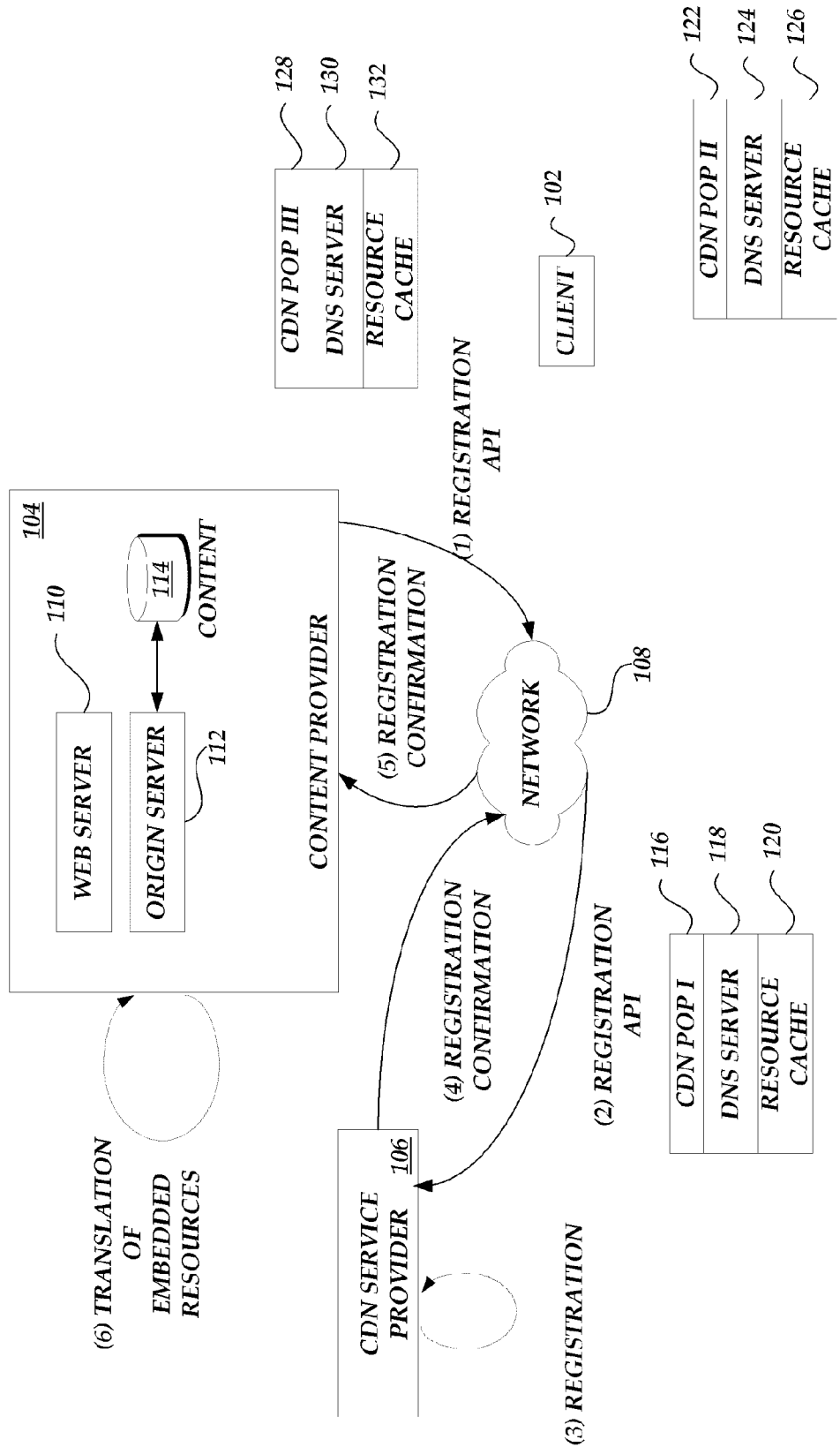
FIG. 2 is a block diagram of the content delivery environment of FIG. 1 illustrating the registration of a content provider with a content delivery service provider.

With reference to FIG. 2, an illustrative interaction for registration of a content provider 104 with the CDN service provider 106 will be described. As illustrated in FIG. 2, the CDN content registration process begins with registration of the content provider 104 with the CDN service provider 106. In an illustrative embodiment, the content provider 104 utilizes a registration application program interface ("API") to register with the CDN service provider 106 such that the CDN service provider 106 can provide content on behalf of the content provider 104. The registration API includes the identification of the origin server 112 of the content provider 104 that will provide requested resources to the CDN service provider 106. Additionally, as will be explained in greater detail below, the content provider 104 can also provide cost criteria utilized by the CDN service provider 106 to route content requests. In one embodiment, the cost criteria can include the specification of cost threshold in which the content provider 104 specifies one or more cost thresholds utilized by the CDN service provider 106 in selecting a POP to provide requested content (hosted on behalf of the content provider 104). In another embodiment, the cost criteria can also include a selection by the content provider 104 that the CDN service provider 106 should attempt to service resource requests from the POP associated with the lowest available costs.

One skilled in the relevant art will appreciate that upon identification of appropriate origin servers 112, the content provider 104 can begin to direct requests for content from client computing devices 102 to the CDN service provider 106. Specifically, in accordance with DNS routing principles, a client computing device request corresponding to a resource identifier would eventually be directed toward a POP 116, 122, 128 associated with the CDN service provider 106. In the event that the resource cache component 120, 126, 132 of a selected POP does not have a copy of a resource requested by a client computing device 102, the resource cache component will request the resource from the origin server 112 previously registered by the content provider 104.

With continued reference to FIG. 2, upon receiving the registration API, the CDN service provider 106 obtains and processes the registration information. In an illustrative embodiment, the CDN service provider 106 can then generate additional information that will be used by the client computing devices 102 as part of the content requests. The additional information can include, without limitation, client identifiers, such as client identification codes, content provider identifiers, such as content provider identification codes, cost information identifiers, such as an identification of specific costs thresholds or tiers, executable code for processing resource identifiers, such as script-based instructions, and the like. One skilled in the relevant art will appreciate that various types of additional information may be generated by the CDN service provider 106 and that the additional information may be embodied in any one of a variety of formats.

The CDN service provider 106 returns an identification of applicable domains for the CDN service provider (unless it has been previously provided) and any additional information to the content provider 104. In turn, the content provider 104 can then process the stored content with content provider specific information. In one example, as illustrated in FIG. 2, the content provider 104 translates resource identifiers originally directed toward a domain of the origin server 112 to a domain corresponding to the CDN service provider. The modified URLs are embedded into requested content in a manner such that DNS queries for the modified URLs will resolve to a DNS sever corresponding to the CDN service provider 106 and not a DNS nameserver corresponding to the content provider 104. Although the translation process is illustrated in FIG. 2, in some embodiments, the translation process may be omitted in a manner described in greater detail below.

Generally, the identification of the resources originally directed to the content provider 104 will be in the form of a resource identifier that can be processed by the client computing device 102, such as through a browser software application. In an illustrative embodiment, the resource identifiers can be in the form of a uniform resource locator ("URL"). Because the resource identifiers are included in the requested content directed to the content provided, the resource identifiers can be referred to generally as the "content provider URL." For purposes of an illustrative example, the content provider URL can identify a domain of the content provider 104 (e.g., contentprovider.com), a name of the resource to be requested (e.g., "resource.xxx") and a path where the resource will be found (e.g., "path"). In this illustrative example, the content provider URL has the form of:

http://www.contentprovider.com/path/resource.xxx

During an illustrative translation process, the content provider URL is modified such that requests for the resources associated with the modified URLs resolve to a POP associated with the CDN service provider 106. In one embodiment, the modified URL identifies the domain of the CDN service provider 106 (e.g., "cdnprovider.com"), the same name of the resource to be requested (e.g., "resource.xxx") and the same path where the resource will be found (e.g., "path"). Additionally, the modified URL can include various additional pieces of information utilized by the CDN service provider 106 during the request routing process. Specifically, in an illustrative embodiment, the modified URL can include data indicative of cost information corresponding to information or criteria utilized by the CDN service provider 106 during the request routing process ("cost information"). Specifically, cost information can include financial cost information that is attributable to the content provider 104 for delivery of resources on its behalf. The financial cost can be defined in a variety of ways including flat costs, cost per actual data delivered, cost tiers, cost per average data delivered, and the like. In an illustrative embodiment, the modified URL can include at least a portion of the actual cost information in the URL. Alternatively, the modified URL can include one or more identifiers that allow the CDN service provider 106 to obtain the appropriate cost information.

Additionally, the modified URL can include any additional information utilized by the CDN service provider during the request routing information, including, but not limited to, content provider IDs, service plan information, file identifiers, and the like. The modified URL would have the form of:

http://additional_information.cost_information.cdnprovider.com/path/resource.xxx In another embodiment, the information associated with the CDN service provider 106 is included in the modified URL, such as through prepending or other techniques, such that the modified URL can maintain all of the information associated with the original URL. In this embodiment, the modified URL would have the form of:

http://additional_information.cost_information.cdnprovider.com/www.contentprovider.com/path/resource.xxx In both of the above examples, the cost information and additional information are separated as separate labels in the modified URL. One skilled in the relevant art will appreciate that the cost information and any additional information can be combined together in a single label of the modified URL. Additionally, the cost information may be omitted from the modified URL and obtained by the CDN service provider 106 during the request routing process, such as a lookup according to a content provider identifier.

Figure 3:
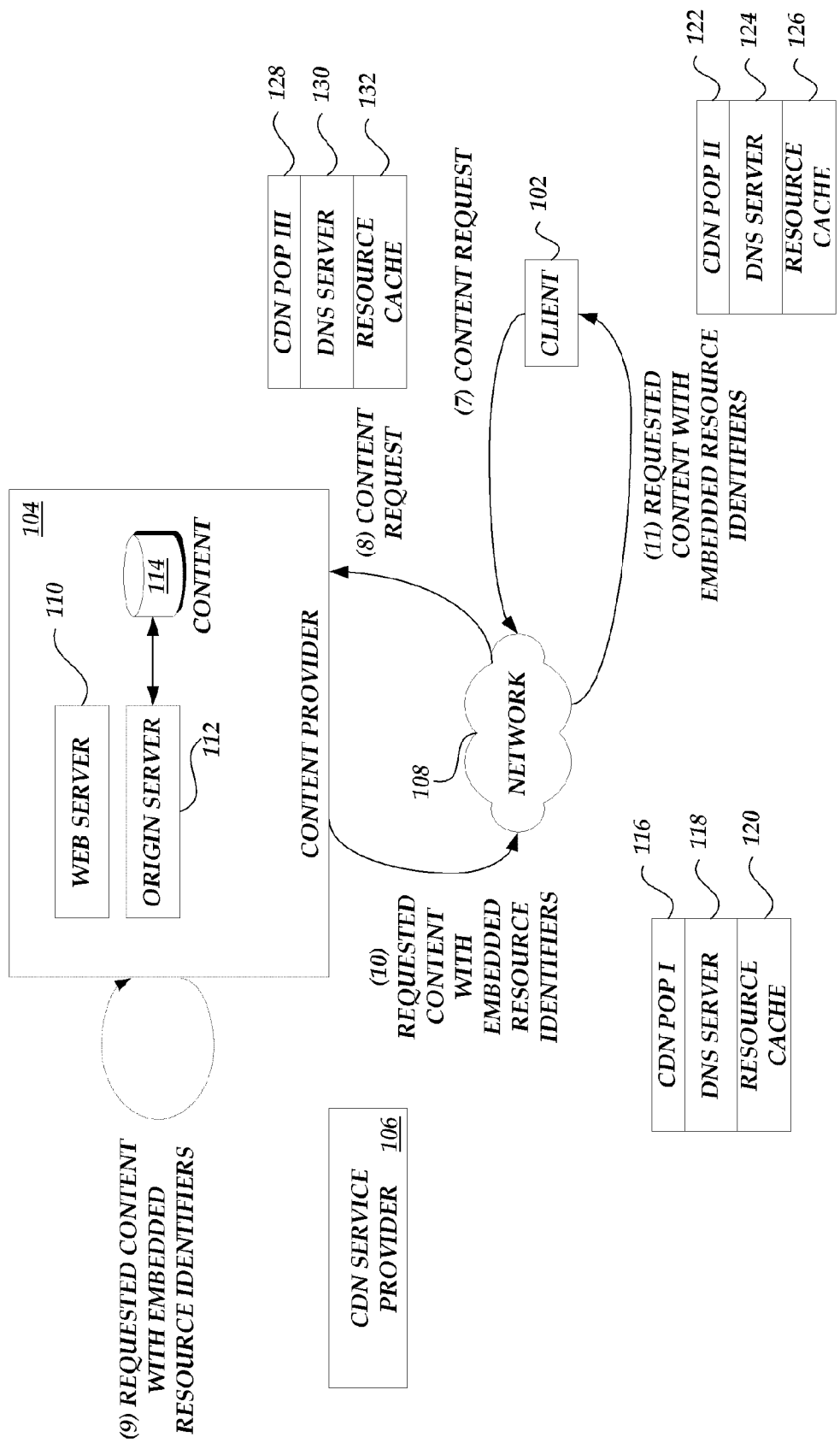
FIG. 3 is a block diagram of the content delivery environment of FIG. 1 illustrating the generation and processing of a content request from a client computing device to a content provider.

With reference now to FIG. 3, after completion of the registration and translation processes illustrated in FIG. 2, a client computing device 102 subsequently generates a content request that is received and processed by the content provider 104, such as through the Web server 110. In accordance with an illustrative embodiment, the request for content can be in accordance with common network protocols, such as the hypertext transfer protocol ("HTTP"). Upon receipt of the content request, the content provider 104 identifies the appropriate responsive content. In an illustrative embodiment, the requested content can correspond to a Web page that is displayed on the client computing device 102 via the processing of information, such as hypertext markup language ("HTML"), extensible markup language ("XML"), and the like. The requested content can also include a number of embedded resource identifiers, described above, that corresponds to resource objects that should be obtained by the client computing device 102 as part of the processing of the requested content. The embedded resource identifiers will generally be in the form of the modified URLs as described above. Alternatively, the embedded resource identifiers can remain in the form of the content provider URLs that would be received and processed by a DNS nameserver associated with the content provider 104. In this alternative embodiment, the receiving DNS nameserver would use a canonical name record ("CNAME") that would identify the network storage component 110. Upon receipt of the returned CNAME, the client computing device 102 subsequently transmits a DNS query corresponding to the received CNAME. The client computing device 102 can then process the received CNAME in a manner similar to the modified URLs, described below. For ease of illustration, however, the alternative embodiment will not be described in further detail and the additional processing steps will only be described with regard to the modified URL. One skilled in the relevant will appreciate that the below description may be applicable to CNAMEs as described in the alternative embodiment.

Upon receipt of the requested content, the client computing device 102, such as through a browser software application, begins processing any of the markup code included in the content and attempts to acquire the resources identified by the embedded resource identifiers. Accordingly, the first step in acquiring the content correspond to the issuance, by the client computing device 102 (through its local DNS resolver), a DNS query for the modified URL resource identifier that results in the identification of a DNS nameserver authoritative to the "." and the "com" portions of the modified URL. After partially resolving the "." and "com" portions of the embedded URL, the client computing device 102 then issues another DNS query for the resource URL that results in the identification of a DNS nameserver authoritative to the ".cdnprovider" portion of the embedded URL. The issuance of DNS queries corresponding to the "." and the "com" portions of a URL are well known and have not been illustrated.

Figure 4:
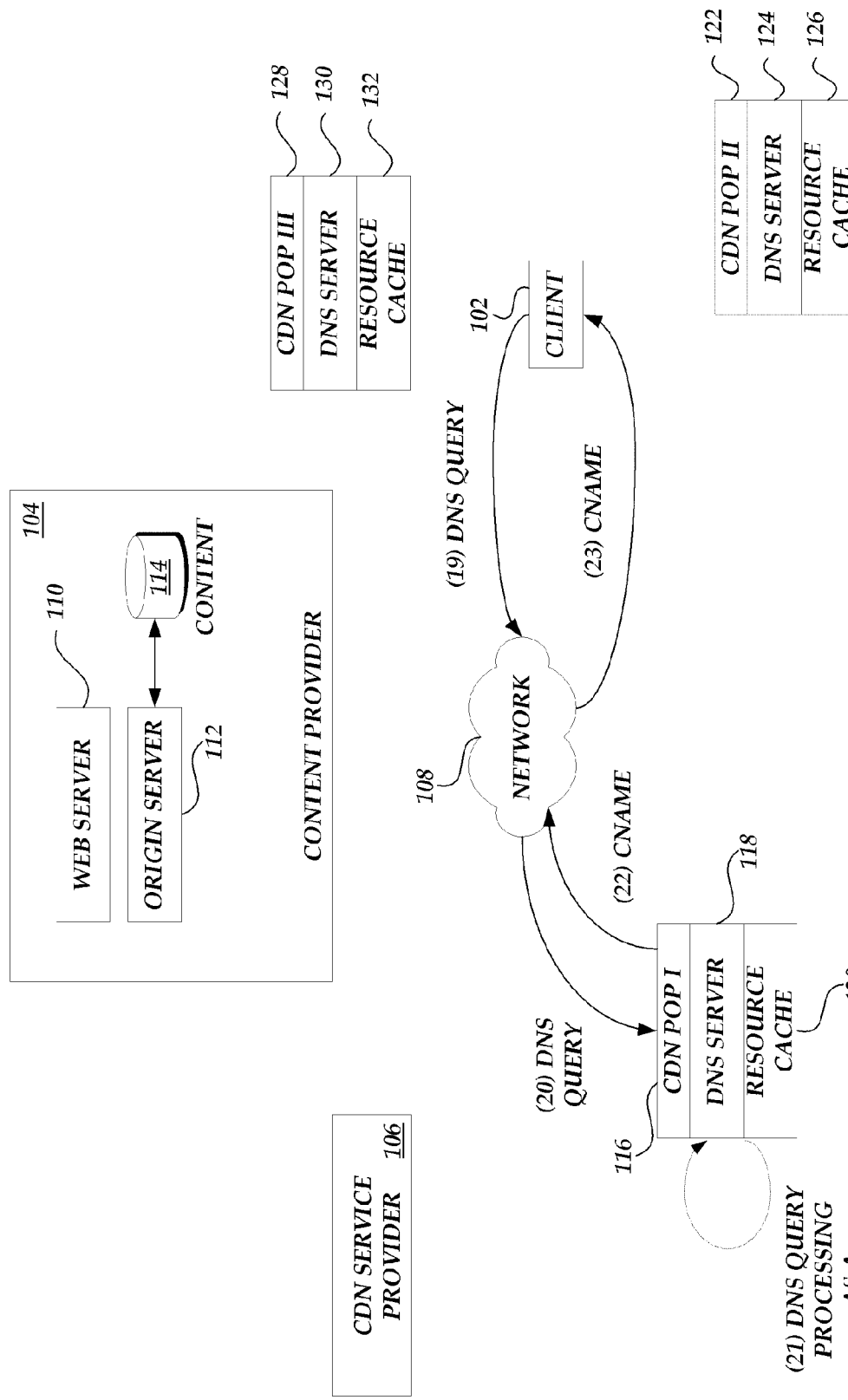
FIG. 4 is a block diagram of the content delivery environment of FIG. 1 illustrating the generation and processing of a DNS query corresponding to an embedded resource from a client computing device to a content delivery network service provider.

With reference now to FIG. 4, in an illustrative embodiment, the successful resolution of the "cdnprovider" portion of the original URL identifies a network address, such as an IP address, of a DNS nameserver associated with the CDN service provider 106. In one embodiment, the IP address is a specific network address unique to a DNS nameserver component of a POP. In another embodiment, the IP address can be shared by one or more POPs. In this embodiment, a further DNS query to the shared IP address utilizes a one-to-many network routing schema, such as anycast, such a specific POP will receive the request as a function of network topology. For example, in an anycast implementation, a DNS query issued by a client computing device 102 to a shared IP address will arrive at a DNS nameserver component logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a POP.

With continued reference to FIG. 4, in either of the above identified embodiments (or any other embodiment), a specific DNS nameserver in the DNS component 118 of a POP 116 receives the DNS query corresponding to the original URL from the client computing device 102. Once one of the DNS nameservers in the DNS component 118 receives the request, the specific DNS nameserver attempts to resolve the request. In an illustrative embodiment, a specific DNS nameserver can resolve the DNS query by identifying an IP address of a cache server component that will process the request for the requested resource. As described above, a selected resource cache component can process the request by either providing the requested resource if it is available or attempt to obtain the requested resource from another source, such as a peer cache server computing device or the origin server 112 of the content provider 104.

As an alternative to selecting a cache server component, the CDN service provider 106 can maintain sets of various alternative resource identifiers. The alternative resource identifiers can be provided by the CDN service provider 106 to the client computing device 102 such that a subsequent DNS query on the alternative resource identifier will resolve to a different DNS nameserver component within the CDN service provider's network. In an illustrative embodiment, the alternative resource identifiers are in the form of one or more CNAME records. In one embodiment, each CNAME record identifies a domain of the CDN service provider 106 (e.g., "cdnprovider.com" or "cdnprovider-1.com"). As will be explained in greater detail below, the domain in the CNAME does not need to be the same domain found in original URL or in a previous CNAME record. In a manner similar to the information described above, each CNAME record includes additional information utilized by a receiving DNS nameserver for processing the DNS query. In an illustrative embodiment, the additional information can include cost information corresponding to information or criteria utilized by the CDN service provider 106 during the request routing process. The cost information included in the CNAME can be the same cost information provided in the modified URL or additional/alternative costs information obtained by the CDN service provider 106. Additionally, in embodiments in which cost information is not provided in the modified URL, the cost information would corresponding to cost information obtained by the CDN service provider 106 (directly or indirectly). As also described above, the CNAME can also include additional request routing information, (e.g., "request routing information") utilized by the CDN service provider 106. An illustrative CNAME record can have the form of:

http://additional_information.cost_information.cdnprovider.com/path/resources.xxx
        CNAME    request_routing_information.cost_information.cdnprovider.com In an illustrative embodiment, the CNAME records are generated and provided by the DNS nameservers to direct a more appropriate DNS nameserver of the CDN service provider 106. As used in accordance with the present disclosure, appropriateness can be defined in any manner by the CDN service provider 106 for a variety of purposes.

In an illustrative embodiment, the CDN service provider 106 will utilize the cost information, at least in part, to identify the more appropriate DNS nameserver of the CDN service provider 106. As previously mentioned, the cost information corresponds to a financial cost attributable to the content provider 104 for the delivery of resources by the CDN service provider 106. The financial cost may be defined in a variety of ways. The determination of the appropriate DNS nameserver of the CDN service provider 106 as a function of cost information will depend on the cost information included in modified URL or otherwise obtained by the CDN server provider 106.

In one example, the cost information may designate that the content provider 104 has requested that the CDN service provider 106 select the DNS nameserver of the CDN service provider 106 associated with the lowest current financial cost to provide the requested resource. Accordingly, the CDN service provider 106 could obtain cost information for at least a portion of the POPs and select the DNS nameserver associated with the lowest financial cost. The financial cost information utilized to select the lowest financial costs may be based on a current financial costs or projected financial costs. The projected financial costs can be based on criteria, such as time of day, characteristics of the resource (e.g., size of the data, type of data, etc.), anticipated data throughput volumes, current loads experienced by the CDN service provider 106, and the like. For example, if a CDN service provider's POP resources are at an optimal capacity, the CDN service provider 106 may project financial cost at a premium cost level (e.g., a highest cost level) because any additional data traffic would cause the resources to operate above optimal rates. Conversely, the CDN service provider 106 may project lower financial costs for specific POPs according to historically known low volume times (e.g., time of day, days of the month, time of the year, special days/holidays, etc.).

In another example, the cost information may designate the content provider 104 has requested that the cost associated with the providing the requested resource be maintained below one or more cost thresholds or cost tiers. Accordingly, the CDN service provider 106 could obtain cost information for at least a portion of the POPs and select one or more DNS nameservers associated with a financial cost at or below the cost thresholds. The CDN service provider 106 could then utilize other request routing criteria to select from the selected DNS nameserver (if more than one DNS nameserver is identified) or selected in accordance with other selections methodologies (e.g., random, round robin, etc.).

As described above, in addition to the consideration of cost information, the CDN service provider 106 can utilize the additional information (e.g., the "additional information") included in the modified URL to select a more appropriate POP. In one aspect, the CDN service provider 106 can utilize the additional information to select from a set of DNS nameservers identified as satisfying criteria specified in the cost information. In another aspect, the CDN service provider 106 can utilize the additional information to validate the POP selected in accordance with the cost information or to select an alternative DNS nameserver previously selected in accordance with the cost information. In still another aspect, the CDN service provider 106 can utilize the additional information to select a set of potentially applicable POPs (e.g., meeting minimum service levels) and then utilize the cost information to prioritize from the set of potentially applicable POPs.

In one example, the CDN service provider 106 can attempt to direct a DNS query to DNS severs according to geographic criteria. The geographic criteria can correspond to geographic-based regional service plans contracted between the CDN service-provider 106 and the content provider 104 in which various CDN service provider 106 POPs are grouped into geographic regions. Accordingly, a client computing device 102 DNS query received in a region not corresponding to the content provider's regional plan may be better processed by a DNS nameserver in region corresponding to the content provider's regional plan. In this example, the DNS nameserver component 118 may also obtain geographic information from the client directly (such as information provided by the client computing device or ISP) or indirectly (such as inferred through a client computing device's IP address).

In another example, the CDN service provider 106 can attempt to direct a DNS query to DNS nameservers according to service level criteria. The service level criteria can correspond to service or performance metrics contracted between the CDN service provider 106 and the content provider 104. Examples of performance metrics can include latencies of data transmission between the CDN service provider POPs and the client computing devices 102, total data provided on behalf of the content provider 104 by the CDN service provider POPs, error rates for data transmissions, and the like.

In still a further example, the CDN service provider 106 can attempt to direct a DNS query to DNS severs according to network performance criteria. The network performance criteria can correspond to measurements of network performance for transmitting data from the CDN service provider POPs to the client computing device 102. Examples of network performance metrics can include network data transfer latencies (measured by the client computing device or the CDN service provider 106 network data error rates, and the like.

In accordance with an illustrative embodiment, the DNS nameserver maintains a data store that defines CNAME records for various URLs. If a DNS query corresponding to a particular URL matches an entry in the data store, the DNS nameserver component 118 returns a CNAME record as defined in the data store. In an illustrative embodiment, the data store can include multiple CNAME records corresponding to a particular original URL. The multiple CNAME records would define a set of potential candidates that can be returned to the client computing device. In such an embodiment, the DNS nameserver component 118, either directly or via a network-based service, can implement additional logic in selecting an appropriate CNAME from a set of possible of CNAMEs. In an illustrative embodiment, each DNS nameserver component 118, 124, 130 maintains the same data stores that define CNAME records, which can be managed centrally by the CDN service provider 106. Alternatively, each DNS nameserver component 118, 124, 130 can have a POP specific data stores that define CNAME records, which can be managed centrally by the CDN service provider 106 or locally at the POP 116, 122, 128.

The returned CNAME can also include request routing information that is different from or in addition to the information provided in URL/CNAME of the current DNS query. For example, if the CNAME selection is based on regional plan, a specific regional plan can be identified in the "request_routing_information" portion of the specific CNAME record. A similar approach could be taken to identify service level plans and file management by including a specific identifier in the "request_routing_information" portion of the CNAME record. In another embodiment, request routing information can be found in the identification of a CDN service provider 106 domain different from the domain found in the current URL/CNAME. For example, if the CNAME is based on regional plan, a specific regional plan domain (e.g., "cdnprovder-region1.com") could be used in the domain name portion of the specific CNAME record. Any additional request routing information can be prepended to the existing request routing information in the current URL/CNAME such that the previous request routing information would not be lost (e.g., serviceplan.regionalplan.cdnprovider.com). One skilled in the relevant art will appreciate that additional or alternative techniques and/or combination of techniques may be used to include the additional request routing information in the CNAME record that is selected by the DNS nameserver component 118.

With continued reference to FIG. 4, one skilled in the relevant art DNS nameserver component 118 may select (or otherwise obtain) a CNAME record that is intended resolve to a more appropriate DNS nameserver of the CDN service provider 106. In may be possible, however, that the same DNS nameserver would also be authoritative for the subsequent DNS query for the CNAME to be provided to the client computing device. For example, a specific DNS nameserver may be authoritative for a both a specific regional plan and a service level plan. Thus, returning a CNAME would still result in the DNS query arriving at the same DNS query (may be due in part to the client computing device's geography). In such an embodiment, the DNS nameserver, such as DNS nameserver component 118, may choose to resolve the future DNS query in advance.

Figure 5:
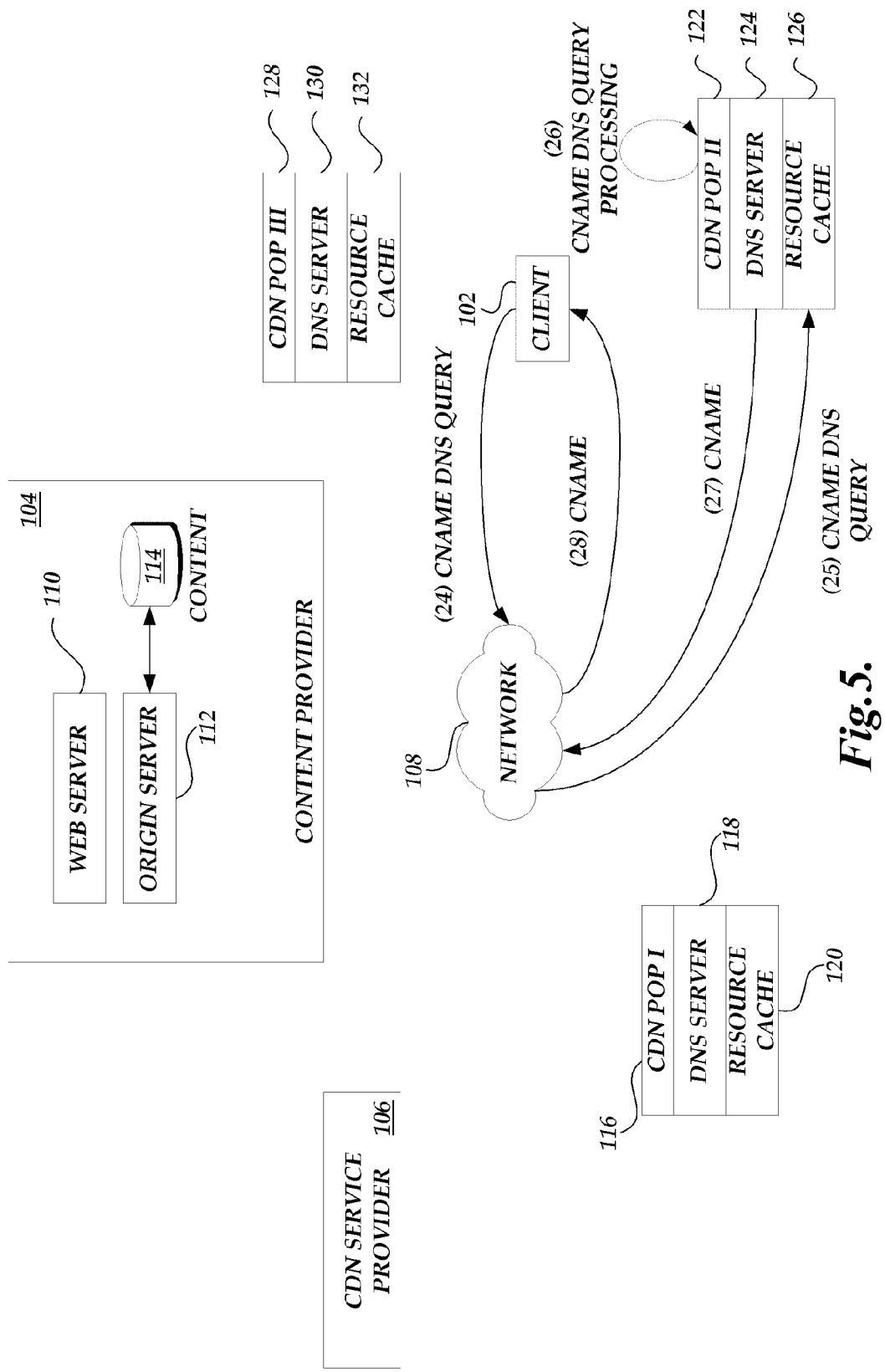
FIG. 5 is a block diagram of the content delivery environment of FIG. 1 illustrating the generation and processing of a DNS query corresponding to a first alternative resource identifier from a client computing device to a content delivery network service provider.

With reference now to FIG. 5, upon receipt of the CNAME from the DNS nameserver component 118, the client computing device 102 generates a subsequent DNS query corresponding to the CNAME. As previously discussed with regard to FIG. 4, the DNS query process could first start with DNS queries for the "." and "com" portions, followed by a DNS query for the "cdnprovider" portion of the CNAME. To the extent, however, that the results of a previous DNS queries can be cached (and remain valid), the client computing device 102 can utilize the cached information and does not need to repeat the entire process. However, at some point, depending on whether the CNAME provided by DNS nameserver component 118 (FIG. 4) and the previous URL/CNAME share common CDN service provider domains, resolves to a different POP provided by the CDN service provider 106. As illustrated in FIG. 5, the DNS nameserver component 124 of POP 122 is now authoritative based on the different information in the current CNAME previously provided by the DNS nameserver component 118. As previously described, the DNS nameserver component 124 can then determine whether it is authoritative to resolve the DNS query on the entire CNAME by providing a responsive IP address of a cache component that will process the content request or whether to provide another alternative resource identifier selected in the manner described above. As described above, the DNS nameserver remains operative to receive DNS queries on behalf of the CDN service provider 106 even it is not authoritative to fully resolve the DNS query by providing an IP address.

Figure 6:
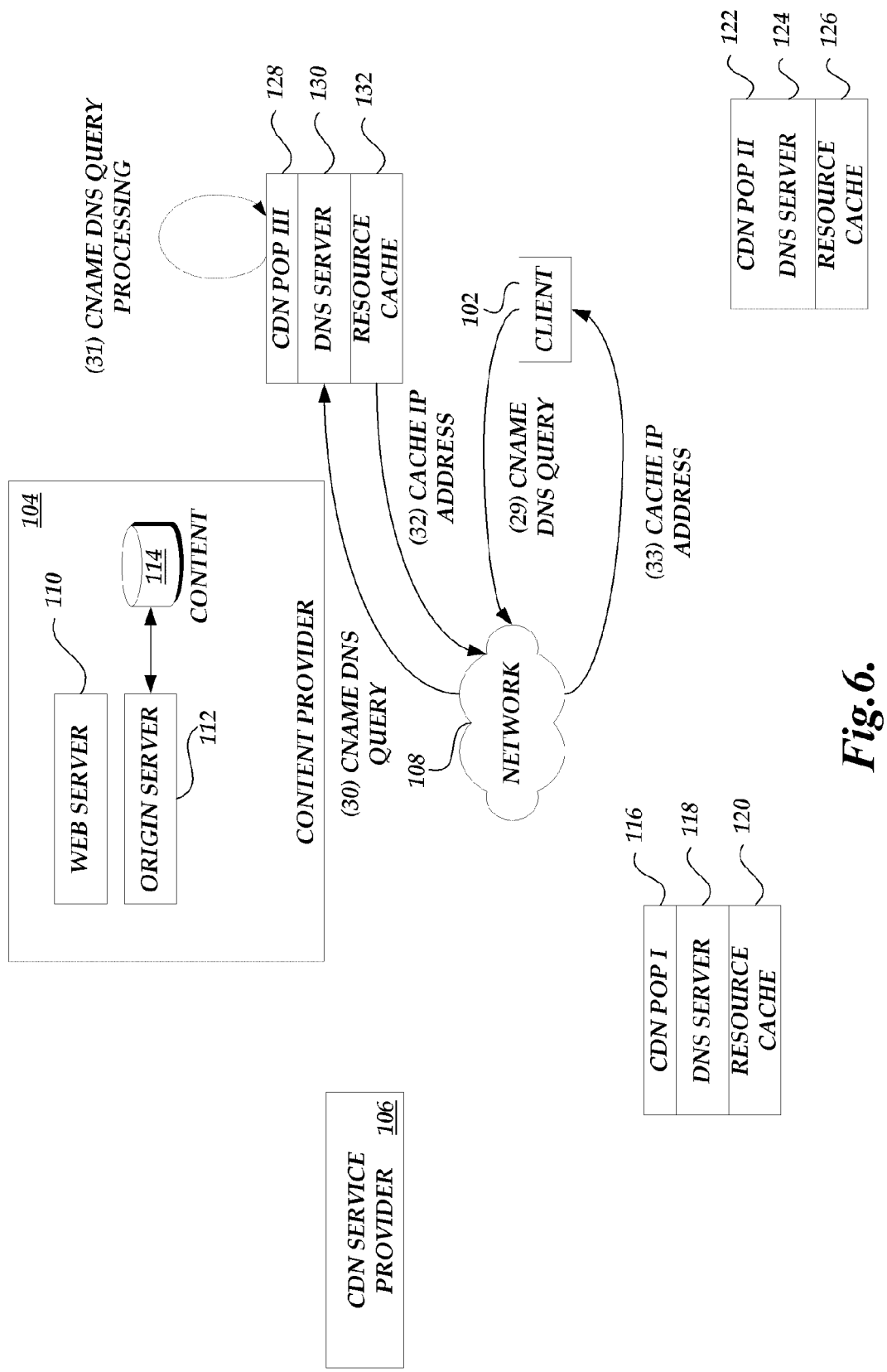
FIG. 6 is a block diagram of the content delivery environment of FIG. 1 illustrating the generation and processing of a DNS query corresponding to a second alternative resource identifier from a client computing device to a content delivery network service provider.

For purposes of illustration, assume that the DNS nameserver component 118 determines that the DNS query corresponding to the current CNAME (provided by DNS nameserver component 116) also corresponds to a CNAME record in its data store. In such an example, the DNS nameserver component 124 would do any necessary processing to select a specific CNAME and return the CNAME to the client computing device. With reference now to FIG. 6, the client computing device 102 would now transmit a second subsequent DNS query corresponding to the CNAME provided by DNS nameserver component 124 (FIG. 5). In accordance with DNS query processes already described, the DNS query would illustratively be received by the DNS nameserver component 130 of POP 128. Again, the DNS nameserver component 130 can then determine whether to resolve the DNS query on the CNAME with an IP address of a cache component that will process the content request or whether to provide another alternative resource identifier selected in the manner described above. In this example, the DNS nameserver component 130 returns an IP address.

In an illustrative embodiment, the DNS nameserver components, such as DNS nameserver component 130, can utilize a variety of information in selecting a resource cache component. In one example, the DNS nameserver component can default to a selection of a resource cache component of the same POP. In another example, the DNS nameserver components can select a resource cache component based on various load balancing or load sharing algorithms. Still further, the DNS nameserver components can utilize network performance metrics or measurements to assign specific resource cache components. The IP address selected by a DNS nameserver component may correspond to a specific caching server in the resource cache. Alternatively, the IP address can correspond to a hardware/software selection component (such as a load balancer).

Figure 7:
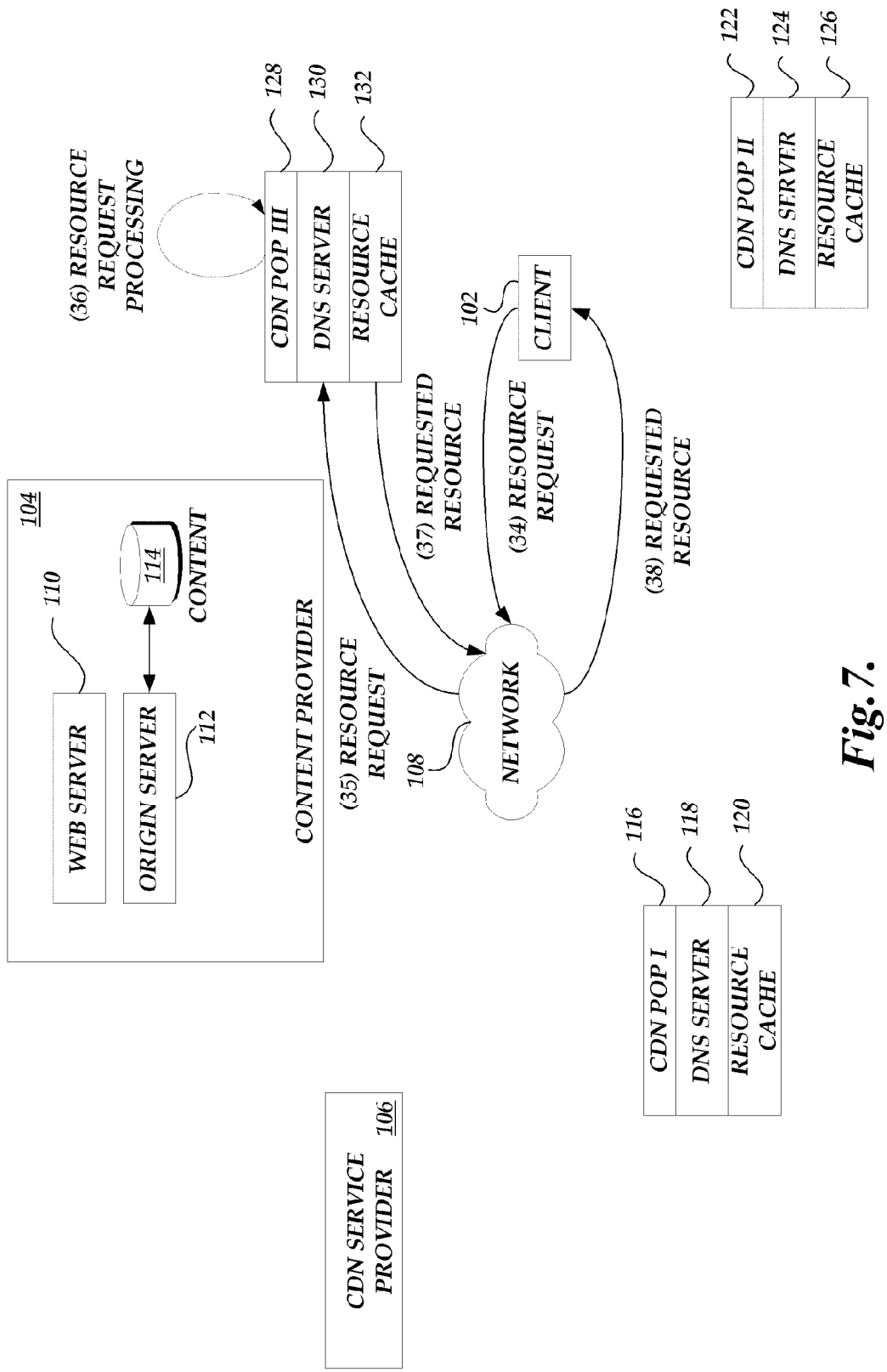
FIG. 7 is a block diagram of the content delivery environment of FIG. 1 illustrating the generation and processing of embedded resource requests from a client computing device to a content delivery network service provider.

With reference now to FIG. 7, in an illustrative example, assume that the DNS nameserver component 130 has selected the resource cache component 132 of POP 128. Upon receipt of the IP address for the resource cache component 132, the client computing device 102 transmits requests for the requested content to the resource cache component 132. The resource cache component 132 processes the request in a manner described above and the requested content is transmitted to the client computing device 102.

With reference now to FIG. 8, a request routine 800 implemented by the CDN provider 106 will be described. One skilled in the relevant art will appreciate that actions/steps outlined for routine 800 may be implemented by one or many computing devices/components that are associated with the CDN service provider 106. Accordingly, routine 800 has been logically associated as being performed by the CDN service provider 106.

At block 802, one of the DNS nameserver components 118, 124, 130 obtains a DNS query corresponding to resource identifier (the "receiving DNS nameserver"). As previously discussed, the resource identifier can be a URL that has been embedded in content requested by the client computing device 102 and previously provided by the content provider 104. Alternatively, the resource identifier can also correspond to a CNAME provided by a content provider DNS nameserver in response to a DNS query previously received from the client computing device 102. At block 804, the receiving DNS nameserver obtains content provider cost information. As described above, in an illustrative embodiment, the cost information may be included, at least in part, in the modified URL or CNAME. Such cost information may specify that the CDN service provider 106 should utilize cost information in attempting to resolve the DNS query. Alternatively, the cost information may specify specific financial cost thresholds to be utilized by the CDN service provider in attempting to resolve the DNS query. In another embodiment, the receiving DNS nameserver can obtain the cost information, or portion thereof, according to a client identifier including the "additional information" or "request routing information" labels of the modified URL or CNAME, respectively.

At decision block 806, a test is conducted to determine whether the current DNS nameserver is authoritative to resolve the DNS query. In one illustrative embodiment, the DNS nameserver can determine whether it is authoritative to resolve the DNS query if there are no CNAME records corresponding to the received resource identifier. For example, based on the receiving DNS nameserver may maintain one or more CNAMEs that define various cost alternatives for request routing processing. In this embodiment, the receiving DNS can utilize the cost information obtained in block 804 to select the appropriate CNAME. Alternatively, the receiving DNS may select a CNAME without requiring additional information from the URL or CNAME. As previously discussed the selection of the appropriate CNAME corresponding to the alternative POP will depend in part on the cost criteria implemented by the CDN service provider 106. In one example, the cost information may designate that the content provider 104 has requested that the CDN service provider 106 select the DNS nameserver of the CDN service provider 106 associated with the lowest current cost to provide the requested resource. Accordingly, the CDN service provider 106 could obtain cost information for at least a portion of the POPs and select a CNAME corresponding to a DNS nameserver associated with the lowest cost. In another example, the cost information may designate the content provider 104 has requested that the cost associated with the providing the requested resource be maintained below one or more cost thresholds or cost tiers. Accordingly, the CDN service provider 106 could obtain cost information for at least a portion of the POPs and select a CNAME corresponding to a DNS nameserver associated with a cost satisfying the specified cost threshold. Alternative or additional methodologies may also be practiced to determine whether the DNS nameserver is authoritative.

If the current DNS nameserver is authoritative (including a determination that the same DNS nameserver will be authoritative for subsequent DNS queries), the current DNS nameserver resolves the DNS query by returning the IP address of cache server component at block 808. In a non-limiting manner, a number of methodologies for selecting an appropriate resource cache component have been previously discussed. Additionally, as described above, the IP address may correspond to a specific cache server of a resource cache component or generally to group of cache servers.

Alternatively, if at decision block 806, the DNS nameserver is not authoritative, at block 810, the DNS nameserver component selects and transmits an alternative resource identifier. As described above, the DNS nameserver component can utilize a data store to identify an appropriate CNAME as a function of the current DNS query. Additionally, the DNS nameserver component can also implement additional logical processing to select from a set of potential CNAMES. At block 812, different DNS nameserver components 118, 124, 130 receive a DNS query corresponding to the CNAME. The routine 800 then returns to decision block 806 and continues to repeat as appropriate.

Although routine 800 has been illustrated with regard to the utilization of alternative resource identifiers (e.g., CNAMES) to facilitate the request routing processing to different DNS severs within the CDN server provider 106 network. One skilled in the relevant art will appreciate that CDN service provider 106 may utilize cost information included in the modified URL to resolve DNS queries without utilizing an alternative resource identifier. In such an embodiment, the CDN service provider would utilize a communication network and protocol to facilitate the forwarding of DNS queries selected according to cost information.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for request routing comprising:

obtaining a DNS query from a client computing device at a first DNS nameserver, wherein the DNS query corresponds to a requested resource associated with an original resource identifier provided by a content provider, wherein the DNS query comprises at least part of the original resource identifier and specific content provider cost information, and wherein the first DNS nameserver corresponds to a content delivery network service provider that is different from the content provider;

determining whether the first DNS nameserver is authoritative to the DNS query as a function of the specific content provider cost information included in the DNS query, wherein the specific content provider cost information includes a financial cost attributable to the content provider for delivery of resources on behalf of the content provider;

obtaining an alternative resource identifier based on information associated with the client computing device and the content provider if the DNS nameserver is determined not to be authoritative, wherein the alternative resource identifier includes information for causing a DNS query to resolve to a domain corresponding to the content delivery service provider and additional routing information not included in the original resource identifier and wherein obtaining an alternative resource identifier further includes:

identifying one or more alternative resource identifiers corresponding to a point of presence associated with a financial cost for providing the requested resource below a cost threshold, wherein the cost threshold is obtained from the specific content provider cost information included in the DNS query; and selecting an alternative resource identifier from the one or more resource identifiers based at least in part on the specific content provider cost information included in the DNS query;

transmitting the alternative resource identifier to the client computing device;

obtaining a subsequent DNS query from the client computing device at a second DNS nameserver, wherein the subsequent DNS query corresponds to the alternative resource identifier provided by the content delivery network service provider, and wherein the second DNS nameserver corresponds to the content delivery network service provider that is different from the content provider;

determining whether the second DNS nameserver is authoritative to the subsequent DNS query; and selecting a cache component for providing content associated with the original resource request if the second DNS nameserver is authoritative to the second DNS query; and transmitting information identifying the selected cache component if the second DNS nameserver is determined to be authoritative.

2. The method as recited in claim 1, wherein the original resource identifier corresponds to a uniform resource locator provided by the content provider such that the DNS query resolves to a domain corresponding to the content delivery network service provider.

3. The method as recited in claim 1, wherein the original resource identifier corresponds to an alternative resource identifier previously provided by the content provider such that the DNS query resolves to a domain corresponding to the content delivery network service provider.

4. The method as recited in claim 1, wherein the alternative resource identifier corresponds to a canonical name record identifier.

5. The method as recited in claim 1, wherein the specific content provider cost information is at least one of appended or prepended to the at least part of the original resource identifier.

6. The method as recited in claim 5 further comprising parsing the at least part of the original resource identifier to obtain the specific content provider cost information.

7. The method as recited in claim 1, wherein the original resource identifier and the alternative resource identifier include information identifying a same domain corresponding to the content delivery service provider.

8. The method as recited in claim 1, wherein the additional routing information associated with the content provider includes regional service information and wherein the alternative resource identifier includes information identifying a regional service plan provided by the content delivery network service provider.

9. The method as recited in claim 1, wherein the additional routing information associated with the content provider includes service level information and wherein the alternative resource identifier includes information identifying a service level plan provided by the content delivery network service provider.

10. The method as recited in claim 1, wherein the additional routing information associated with the content provider includes file information corresponding to the requested content and wherein the alternative resource identifier includes information identifying a file processing plan provided by the content delivery network service provider.

11. The method as recited in claim 1, wherein the additional routing information associated with the client computing device corresponds to a geographic location of the client computing device.

12. The method as recited in claim 1 further comprising:
obtaining a second alternative resource identifier based on information associated with the client computing device and the content provider if the second DNS nameserver is determined not to be authoritative to the subsequent DNS query, wherein the second alternative resource identifier includes information for causing a DNS query to resolve to a domain corresponding to the content delivery service provider and request routing information not included in the original resource identifier or the alternative resource identifier;
transmitting the alternative resource identifier to the client computing device;

obtaining a second subsequent DNS query from the client computing device at a third DNS nameserver, wherein the second subsequent DNS query corresponds to the second alternative resource identifier provided by the content delivery network service provider and wherein the third DNS nameserver corresponds to the content delivery network service provider that is different from the content provider;

determining whether the third DNS nameserver is authoritative to the second subsequent DNS query; and selecting a cache component for providing content associated with the original resource request if the third DNS nameserver is authoritative to the second subsequent DNS query; and transmitting information identifying the selected cache component if the third DNS nameserver is determined to be authoritative to the second subsequent DNS query.

13. The method as recited in claim 1 further comprising:
obtaining a request from the client computing device for the requested content; and
transmitting the requested content from the selected cache component in response to the request from the client computing device.

14. The method as recited in claim 1, wherein the information identifying the selected cache component includes a network address corresponding to the selected cache component.

15. The method as recited in claim 1, wherein obtaining an alternative resource identifier includes selecting an alternative resource identifier corresponding to a point of presence server associated with a lowest financial cost for providing the requested resource.

16. The method as recited in claim 1, wherein selecting an alternative resource identifier from the one or more resource identifiers includes selecting an alternative resource identifier from the one or more resource identifiers based at least in part on one of a characteristic of the content provider and the client computing device.

17. The method as recited in claim 1, wherein selecting an alternative resource identifier from the one or more resource identifiers includes selecting an alternative resource identifier based at least in part on the financial cost for providing the requested resource below a cost threshold and at least one additional request routing criterion.

18. A computer-implemented method for request routing comprising:
obtaining a DNS query from a client computing device at a first DNS nameserver, wherein the DNS query corresponds to a requested resource associated with a resource identifier, wherein the DNS query comprises at least part of the resource identifier and specific financial cost information attributable to an original content provider for delivery of resources on behalf of the original content provider, and wherein the first DNS nameserver corresponds to a content delivery network service provider;

determining that the first resource identifier is associated with an alternative resource identifier as a function of the specific financial cost information included in the DNS query, wherein determining that the first resource identifier is associated with an alternative resource identifier includes:
identifying one or more alternative resource identifiers corresponding to a point of presence associated with a financial cost for providing the requested resource below a cost threshold, wherein the cost threshold is obtained from the specific content provider cost information included in the DNS query; and selecting an alternative resource identifier from the one or more resource identifiers based at least in part on the specific content provider cost information included in the DNS query;

transmitting the alternative resource identifier to the client computing device, wherein the alternative resource identifier includes information for causing a DNS query to resolve to a domain corresponding to the content delivery service provider and supplemental request routing information not included in the first resource identifier;

obtaining a subsequent DNS query from the client computing device at a second DNS nameserver, wherein the subsequent DNS query corresponds to the alternative resource identifier provided by the content delivery network service provider and wherein the second DNS nameserver corresponds to the content delivery network service provider;

resolving the subsequent DNS query, at the second DNS nameserver, to identify a cache component for providing content associated with the original resource request; and transmitting information identifying the identified cache component to the client computing device.

19. The method as recited in claim 18, wherein the resource identifier corresponds to a uniform resource locator such that the DNS query resolves to a domain corresponding to the content delivery network service provider.

20. The method as recited in claim 18, wherein the resource identifier corresponds to an alternative resource identifier such that the DNS query resolves to a domain corresponding to the content delivery network service provider.

21. The method as recited in claim 20, wherein the alternative resource identifier corresponds to a canonical name record identifier.

22. The method as recited in claim 18, wherein the specific cost information is at least one of appended or prepended to the at least part of the resource identifier.

23. The method as recited in claim 18, wherein the resource identifier includes information identifying a first domain corresponding to the content delivery service provider and wherein the alternative resource identifier includes information identifying a second domain corresponding to the content delivery service provider.

24. A system for request routing comprising:

one or more hardware processors configured to implement a first network point of presence associated with a content delivery network service provider, wherein the first network point of presence includes a DNS nameserver component that receives a DNS query from a client computing device, wherein the DNS query corresponds to a requested resource associated with a first resource identifier, wherein the DNS query comprises at least part of the resource identifier and specific financial cost information attributable to an original content provider for delivery of resources on behalf of the original content provider, and wherein the DNS nameserver in the first network point of presence is operative to:

determine that the first resource identifier is associated with an alternative resource identifier as a function of the specific financial cost information obtained from the DNS query, wherein determining that the first resource identifier is associated with an alternative resource identifier includes:

identifying one or more alternative resource identifiers corresponding to a point of presence associated with a financial cost for providing the requested resource below a cost threshold, wherein the cost threshold is obtained from the specific content provider cost information included in the DNS query; and selecting an alternative resource identifier from the one or more resource identifiers based at least in part on the specific content provider cost information included in the DNS query; and transmit an alternative resource identifier to the client computing device, wherein the alternative resource identifier includes information for causing a DNS query to resolve to a domain corresponding to the content delivery service provider and supplemental request routing information not included in the first resource identifier;

one or more hardware processors configured to implement a second network point of presence associated with a content delivery network service provider, wherein the second network point of presence includes a DNS nameserver component that receives a subsequent DNS query from a client computing device, wherein the subsequent DNS query corresponds to a requested resource associated with the alternative resource identifier, and wherein the DNS nameserver in the second network point of presence is operative to:

resolve the subsequent DNS query to identify a cache component for providing content associated with the original resource request; and transmit information identifying the identified cache component to the client computing device.

25. The system as recited in claim 24, wherein the first_resource identifier corresponds to a uniform resource locator provided by the original content provider such that the DNS query resolves to a domain corresponding to the content delivery network service provider.

26. The system as recited in claim 24, wherein the specific financial cost information is at least one of appended or prepended to the at least part of the first resource identifier.

27. The system as recited in claim 26, wherein the DNS nameserver in the first network point of presence is further operative to parse the DNS query to obtain the specific financial cost information.

28. The system as recited in claim 24, wherein the alternative resource identifier corresponds to a canonical name record identifier.

29. The system as recited in claim 24, wherein the information associated with the original content provider includes regional service information and wherein the alternative resource identifier includes information identifying a regional service plan provided by the content delivery network service provider.

30. The system as recited in claim 24, wherein the DNS nameserver in the first network point of presence is operative to obtain the information corresponding to a geographic location of the client computing device.

31. The system as recited in claim 24, wherein information identifying the identified cache component to the client computing device includes a network address of a cache component in the second network point of presence.

32. The system as recited in claim 24, wherein information identifying the identified cache component to the client computing device includes a network address of a cache component in another network point of presence.

33. The system as recited in claim 24, wherein the DNS nameserver in the first network point of presence is operative to select an alternative resource identifier corresponding to a component associated with a lowest cost for providing the requested resource.

34. The system as recited in claim 24, wherein the DNS nameserver in the first network point of presence is operative to:

- identify one or more alternative resource identifiers corresponding to a component associated with a cost for providing the requested resource below a cost threshold, wherein the cost threshold is obtained from the specific cost information included in the DNS query; and
- select an alternative resource identifier from the one or more resource identifiers.

* * * * *